(12) United States Patent
Kazama

(10) Patent No.: US 10,318,619 B2
(45) Date of Patent: Jun. 11, 2019

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventor: Yuji Kazama, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 151 days.

(21) Appl. No.: 15/348,607

(22) Filed: Nov. 10, 2016

(65) Prior Publication Data

US 2017/0329750 A1 Nov. 16, 2017

(30) Foreign Application Priority Data

May 12, 2016 (JP) ................... 2016-096140

(51) Int. Cl.
*G06F 17/24* (2006.01)
*G06F 3/0481* (2013.01)
*G06Q 10/10* (2012.01)

(52) U.S. Cl.
CPC .......... *G06F 17/24* (2013.01); *G06F 3/0481* (2013.01); *G06F 17/241* (2013.01); *G06Q 10/10* (2013.01); *G06Q 10/103* (2013.01)

(58) Field of Classification Search
CPC ..................................... G06F 17/241
USPC ......................... 715/762, 765, 780
See application file for complete search history.

(56) References Cited

U.S. PATENT DOCUMENTS 5,502,803 A * 3/1996 Yoshida .............. G06F 3/04883
345/179
2012/0311422 A1* 12/2012 Weeldreyer ........... G06F 3/0488
715/220

FOREIGN PATENT DOCUMENTS

JP H06-231128 A 8/1994
JP 2003-281101 A 10/2003

* cited by examiner

*Primary Examiner* — Cao H Nguyen
(74) *Attorney, Agent, or Firm* — Oliff PLC

(57) ABSTRACT

An information processing apparatus including a first indication output unit. The first indication output unit outputs, in a case where a second user edits a document while a first user is not editing the document, an indication for prompting a second user to input a reason for the editing after the second user finishes editing the document.

7 Claims, 23 Drawing Sheets

| 510 | 520 | 530 | 540 | 550 |
|---|---|---|---|---|
| USER ID | EDITING DATE/TIME | DOCUMENT ID | EDITED PORTION | EDITING SCALE |
| user-001 | 04/01/2014 09:30 | doc-123 | 1ab39avl0 | 30 BYTES |
| user-002 | 04/01/2014 09:31 | doc-123 | 4boaker9a | 10 BYTES |
| ... | ... | ... | ... | ... |

500

| 610 | 620 |
|---|---|
| ANNOTATION ID | ACCESS RIGHT |
| | |

| POINT OF VIEW | PRIORITY |
|---|---|
| SCALE OF EDITING | HIGH |
| EDITING FREQUENCY | LOW |
| EDITING METHOD | LOW |
| GROUP/ROLE | INTERMEDIATE |
| ADDITIONAL INFORMATION BY ANNOTATION | HIGH |

FIG. 8

| USER ID | DEGREE OF IMPORTANCE | EDITED PORTION | EDITING USER ID |
|---|---|---|---|
| user-001 | 10 | 4boaker9a | user-002 |
| user-001 | 5 | 3akfe0 | user-003 |
| user-001 | 1 | 8aefawf | user-002 |

FIG. 14

| USER ID | EDITING DATE/TIME | DOCUMENT ID | EDITED PORTION | EDITING SCALE | LOCATION |
|---|---|---|---|---|---|
| user-001 | 04/01/2014 09:30 | doc-123 | 1ab39avl0 | 30 BYTES | JAPAN |
| user-002 | 04/01/2014 09:31 | doc-123 | 4boaker9a | 10 BYTES | JAPAN |
| ... | ... | ... | ... | ... | ... |

FIG. 15

| ANNOTATION ID | ACCESS RIGHT | LOCATION |
|---|---|---|
|  |  |  |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-096140 filed May 12, 2016.

BACKGROUND

(i) Technical Field

The present invention relates to an information processing apparatus, an information processing method, and a non-transitory computer readable medium.

(ii) Related Art

There is a technique of the related art for use in the case where a single document is collaboratively edited by plural users. The technique allows, when one of the plural users edits the document, the other users to immediately check the editing by notifying the other users of content of the editing made by the one user.

SUMMARY

According to an aspect of the invention, there is provided an information processing apparatus including a first indication output unit. The first indication output, unit outputs, in a case where a second user edits a document while a first user is not editing the document, an indication for prompting the second user to input a reason for the editing after the second user finishes editing the document.

BRIEF DESCRIPTION OF THE DRAWINGS

Exemplary embodiments of the present invention will be described in detail based on the following figures, wherein:

FIG. 7 illustrates an example of a data structure of a degree-of-importance calculation rule table;

FIG. 8 illustrates an example of a data structure of a degree-of-importance calculation result table;

FIG. 14 illustrates an example of a data structure of an editing log table;

FIG. 15 illustrates an example of a data structure of an annotation table;

DETAILED DESCRIPTION

Various exemplary embodiments suitable for implementing the present invention will be described below with reference to the accompanying drawings.

First Exemplary Embodiment

Figure 1:
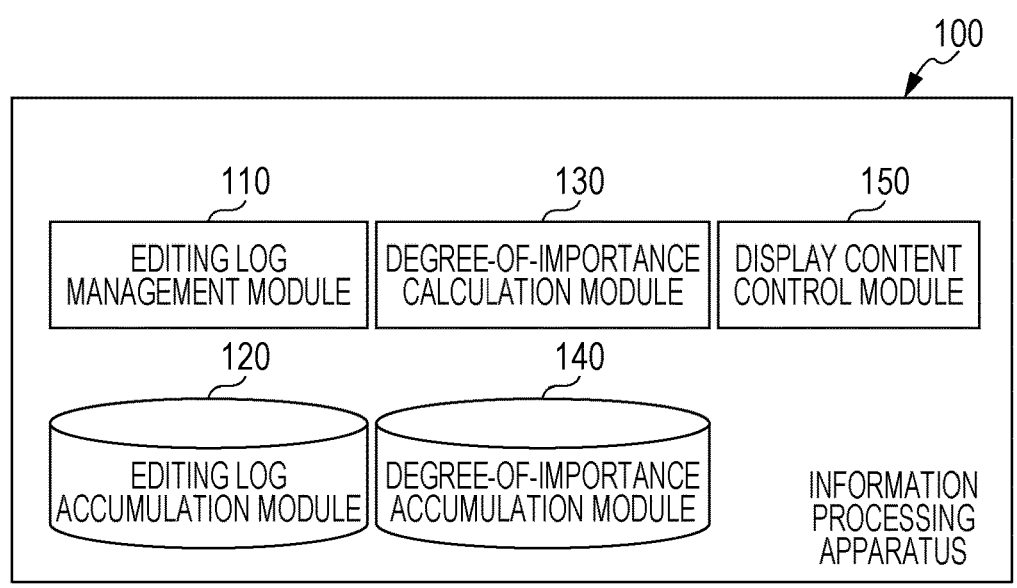
FIG. 1 illustrates an example of a conceptual module configuration according to a first exemplary embodiment.

FIG. 1 illustrates an example of a conceptual module configuration according to a first exemplary embodiment.

In general, the term "module" refers to a logically separable component, such as a software component (a computer program) or a hardware component. Thus, the term "module" used in this exemplary embodiment indicates not only a module in a computer program but also a module in a hardware configuration. For this reason, the exemplary embodiment includes descriptions regarding a computer program causing a computer to function as the modules (such as a program causing a computer to execute each procedure, a program causing a computer to function as each unit, or a program causing a computer to implement each function), a system, and a method. For ease of explanation, the expressions "to store" and "to cause a device to store" and expressions equivalent thereto are used. When the exemplary embodiment is implemented as a computer program, these expressions indicate that the computer program causes a storage device to store information or the computer program performs control to cause a storage device to store information. Also, modules and functions may have one-to-one correspondences; however in implementations, one module may be constituted by one program, plural modules may be constituted by one program, or conversely one module may be constituted by plural programs. In addition, plural modules may be executed by one computer or one module may be executed by plural computers in a distributed or parallel environment. Moreover, one module may include another module. Hereinafter, the term "connection" is used to refer to physical connection and logical connection (such as data exchange or reference relations between instructions and between pieces of data). Further, the term "predetermined" indicates a state where something is determined prior to target processing. The term "predetermined" includes the meaning that something is determined in accordance with a state/status at that time or a state/status up to that point before and even after processing according to the exemplary embodiment starts as long as the determination is made prior to the target processing. In the case where plural "predetermined values" are used, the plural "predetermined values" may be different from each other or two or more values (which obviously include all values) may be the same. Moreover, the expression "if something is A, B is performed" is used to indicate that "it is determined whether or not something is A, and then B is performed if it is determined that something is A", except for the case where determination regarding whether or not something is A is not needed.

In addition, a system or an apparatus may be constituted by plural computers, plural hardware components, plural devices, or the like that are connected to each other via communication networks, such as networks (including one-to-one communication connections), or may be constituted by one computer, one hardware component, one device, or the like. The terms "apparatus" and "system" are used as synonyms to each other. Obviously, the "system" does not include a social "mechanism" (social system) that is an arrangement made by humans.

In each process performed by each module or in each of plural processes performed by a module, information is read from a storage device, the process is performed on the information, and the resulting information obtained from the process is written to the storage device. Thus, a description regarding reading information from the storage device performed prior to the process and writing information to the storage device subsequent to the process is occasionally omitted. Here, examples of the storage device may include a hard disk drive (HDD), a random access memory (RAM), an external storage medium, a storage device connected via a communication network, and registers included in a central processing unit (CPU).

An information processing apparatus 100 according to the first exemplary embodiment is used when a single document is edited through operations performed by plural users. As illustrated in the example in FIG. 1, the information processing apparatus 100 includes an editing log management module 110, an editing log accumulation module 120, a degree-of-importance calculation module 130, a degree-of-importance accumulation module 140, and a display content control module 150.

The editing log management module 110 manages an editing log about when and by whom which part of the document has been edited, by using the editing log accumulation module 120. In particular, the editing log management module 110 manages an editing log of a document that is being collaboratively edited.

In addition, the editing log management module 110 obtains, from the editing log accumulation module 120, log information regarding the document that is being edited by plural users.

The editing log accumulation module 120 is accessed by the editing log management module 110 and stores the editing log. The editing log at least includes information for identifying a component edited in the document and information for identifying a user who has edited the component.

The log information may further include information concerning an organization to which the user belongs or information concerning a role of the user. These pieces of information indicate a relationship between the users, for example, connections in the organization or roles in collaborative editing.

The log information may further include information indicating an amount of edited content.

The log information may further include information indicating whether the edited component is a body of the document or a comment added to the document.

The degree-of-importance calculation module 130 calculates, as a degree of importance, how important the editing is for a user by using the information supplied thereto by the editing log management module 110. At that time, the degree-of-importance calculation module 130 calculates the degree of importance by using the degree-of-importance accumulation module 140.

The degree-of-importance calculation module 130 may also calculate the degree of importance, based on a degree of connection between an organization or role of a first user and an organization or role of a second user.

The degree-of-importance calculation module 130 may also calculate the degree of importance, based on a scale of editing.

The degree-of-importance calculation module 130 may also calculate the degree of importance, based on a frequency of editing.

The degree-of-importance calculation module 130 may also calculate the degree of importance, based on the type of the edited component (whether the edited component is a body or a comment).

The degree-of-importance accumulation module 140 stores a rule for calculating the degree of importance and the calculated degree-of-importance.

The display content control module 150 controls content displayed in relation to an edited part that is important for each user in accordance with information obtained from the degree-of-importance calculation module 130. Note that an outline regarding important editing may be displayed as information independent from the document.

In the case where a user A among the plural users edits a component of the document and then a user B among the plural users edits the component of the document, the display content control module 150 notifies the user A that the component of the document has been edited, in a display manner based on the degree of importance of the editing for the user A. Here, the degree of importance calculated by the degree-of-importance calculation module 130 is used.

Here, examples of the "display manner" include manners related to the shape, the pattern, the color, the positional relationship with another notification, addition of a character indicating the degree of importance, and any selective combination of the above. Accordingly, examples of the "display manner based on the degree of importance" include displaying indications in descending order of the degree of importance and displaying an indication assigned a higher degree of importance in a more emphasized manner.

In addition, the display content control module 150 may make the notification by using an annotation that is addable to the document. An annotation is information added to a document. For example, an annotation is added to a document in a form of an electronic sticky note. In response to a user operation, an annotation may be added to or removed from a document, or the position of the annotation may be changed. In addition, in response to a user operation, content displayed in a sticky note may be added, modified, or removed. In addition, as described below, an access right may be set for an annotation.

In the case where an area where a notification is displayed (area where an indication indicating that a component has been edited is displayed) is selected by a user operation, the display content control module 150 may display the edited component indicated by the notification. For example, the display content control module 150 displays a page including the component indicated by the notification (component edited by the user B).

In the case where the user has signed off, the display content control module 150 may make the notification by using timeline display based on the degree of importance upon the user signing in.

The display content control module 150 may also dynamically update the degree of importance in annotation-based notification or timeline-based notification. The expression "dynamically updating the degree of importance" refers to calculating the degree of importance every time the document is edited and changing the display manner in accordance with the degree of importance.

Figure 2:
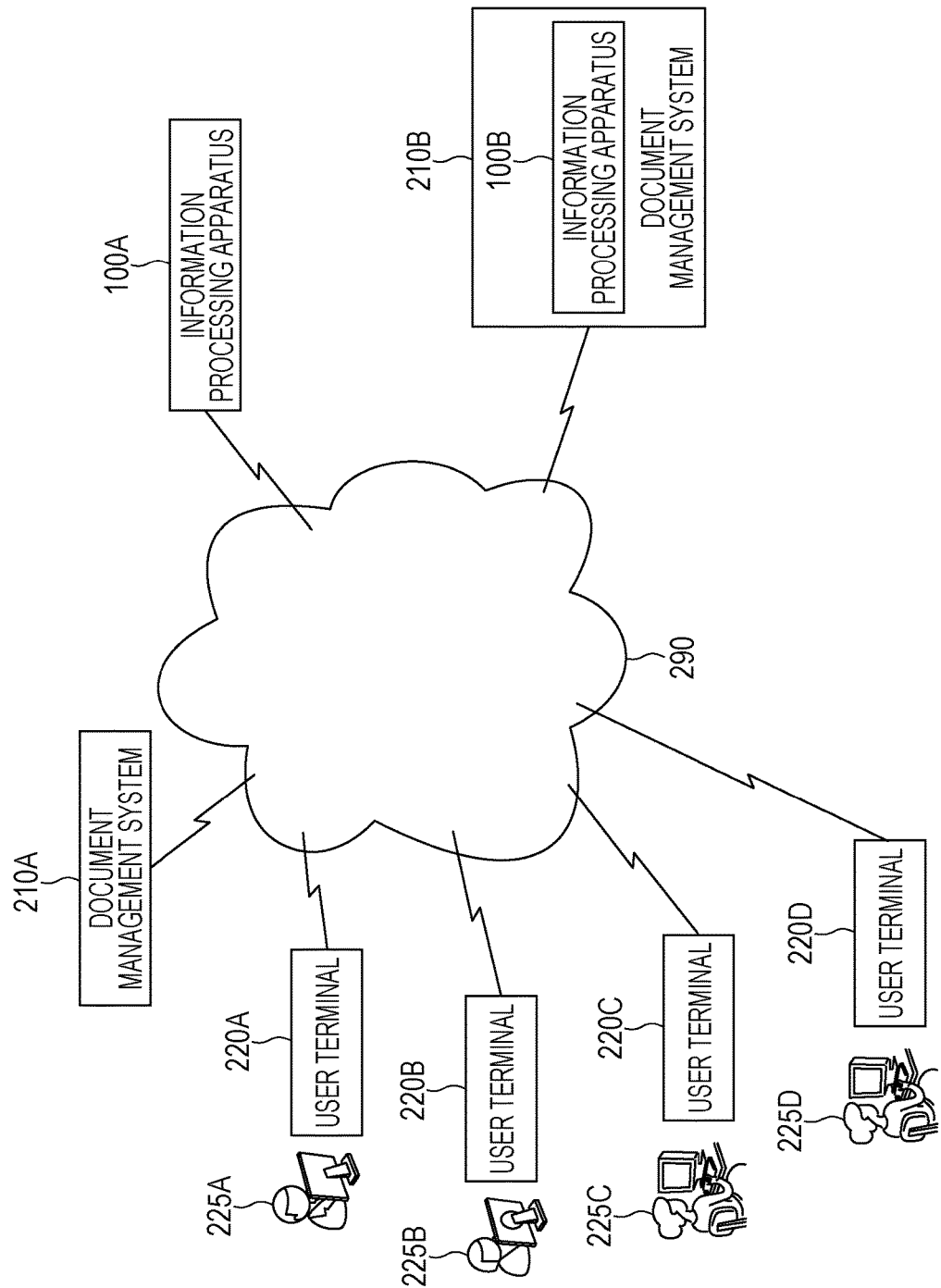
FIG. 2 illustrates an example of a configuration of a system to which the first exemplary embodiment is applied.

FIG. 2 illustrates an example of a configuration of a system to which the first exemplary embodiment is applied.

An information processing apparatus 100A, a document management system 210A, a document management system 210B, a user terminal 220A, a user terminal 220B, a user terminal 220C, and a user terminal 220D are connected to one another via a communication network 290. The document management system 210B includes an information processing apparatus 100B. The communication network 290 may be wired or wireless, or may be a combination thereof. For example, the communication network 290 may be a communication infrastructure, such as the Internet or an intranet. In addition, functions of the information processing apparatus 100A, the document management system 210A, and the document management system 210B may be implemented as cloud services. Hereinafter, the information processing apparatuses 100A and 100B are sometimes collectively referred to as the information processing apparatuses 100; the document management systems 210A and 210B are sometimes collectively referred to as document management systems 210; and the user terminals 220A, 220B, 220C, and 220D are sometimes collectively referred to as user terminals 220.

The document management systems 210 are systems in which digitized documents are registerable. The document management systems 210 have a function that allows a registered document to be collaboratively edited by using the plural user terminals 220. The document management system 210B including the information processing apparatus 100B supplies the editing log to the information processing apparatus 100B. The document management system 210A supplies the editing log to the information processing apparatus 100A via the communication network 290.

The user terminals 220 access the document management system 210 in response to operations performed by respective users 225 (i.e., users 225A, 225B, 225C, and 225D) to allow the users 225 to collaboratively edit a document registered in the document management system 210. For example, in the case where the user terminals 220 are connected to the document management system 210 via the Internet, the user terminals 220 just need to include a web browser. The user terminals 220 may also include the display content control module 150.

Figure 3:
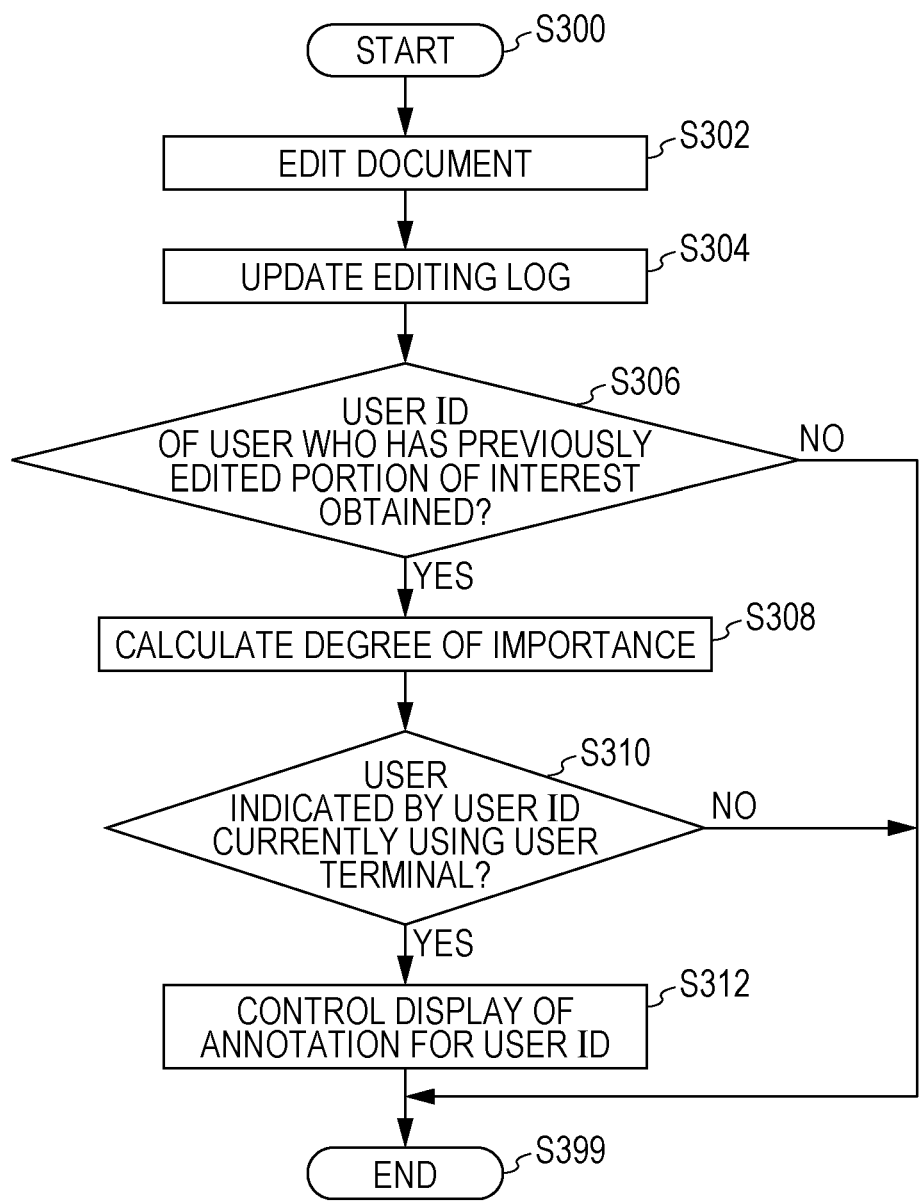
FIG. 3 is a flowchart illustrating an example of a process according to the first exemplary embodiment.

FIG. 3 is a flowchart illustrating an example of a process according to the first exemplary embodiment.

The process starts in step S300. In step S302, a document is edited in response to a user operation. Specifically, once a document registered in the document management system 210 is edited, the information processing apparatus 100 obtains information for uniquely identifying the document (document identification (ID)) in the first exemplary embodiment, information for uniquely identifying an edited portion of the document in the first exemplary embodiment, an ID (user ID) for uniquely identifying a user in the first exemplary embodiment, and an editing date/time.

Figures 4, 5, 6:
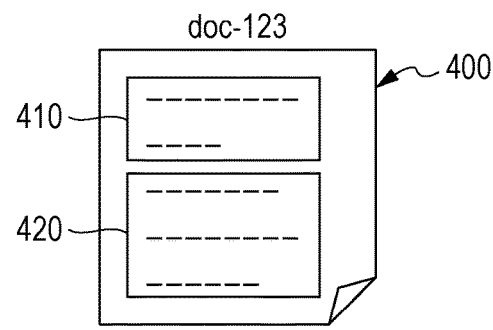
FIG. 4 illustrates an example of a document to be processed in the first exemplary embodiment.
FIG. 5 illustrates an example of a data structure of an editing log table.
FIG. 6 illustrates an example of a data structure of an annotation table.

FIG. 4 illustrates an example of a document to be processed in the first exemplary embodiment.

A document 400 "doc-123" managed by the document management system 210 includes a first area 410 and a second area 420. The user 225A "user-001" and the user 225B "user-002" collaboratively edit the document 400 by using the respective user terminals 220. The first area 410 is an area (1ab39av10) that is a component edited by the user 225A "user-001". The second area 420 is an area (4boaker9a) that is a component edited by the user 225B "user-002".

In step S304, the information processing apparatus 100 updates the editing log. Specifically, the information processing apparatus 100 stores the information obtained in step S302 in the editing log accumulation module 120. More specifically, the information processing apparatus 100 stores, in the editing log accumulation module 120, a log record that indicates "when" and "how", "by whom", "which part" of the collaboratively edited document has been edited. For example, such a log record is stored by using an editing log table 500 in the editing log accumulation module 120. FIG. 5 illustrates an example of a data structure of the editing log table 500. The editing log table 500 includes a user ID field 510, an editing date/time field 520, a document ID field 530, an edited portion field 540, and an editing scale field 550. The user ID field 510 stores information (user ID) for uniquely identifying a user in the first exemplary embodiment. The editing date/time field 520 stores a date/time (represented in a format of year, month, day, hour, minute, second, and millisecond; or any combination of these units) at which editing was performed by the user. The document ID field 530 stores information (document ID) for uniquely identifying a document edited by the user in the first exemplary embodiment. The edited portion field 540 stores information indicating a portion edited by the user. As information regarding the "edited portion", any information that allows an edited portion of the document to be uniquely identified may be used. For example, in the case of a structured document, information regarding the edited portion corresponds to an ID for identifying a component of the structured document. The editing scale field 550 stores the scale of editing performed by the user. As the scale, for example, the number of characters that have been edited (including added and deleted characters) may be used if the target to be edited is text, or an area of a portion that has been edited may be used if the target to be edited is a figure. In addition, details of editing may be stored in the editing log table 500.

In step S306, the information processing apparatus 100 determines whether the user ID of a user who has previously edited the edited portion is successfully obtained. If the user ID is successfully obtained, the process proceeds to step S308; otherwise, the process ends (step S399). Specifically, the information processing apparatus 100 searches the editing log table 500 for the user ID of a user who has edited the same edited portion. If such a user ID is found (YES in step S306), the process proceeds to degree-of-importance calculation processing (step S308). If no such user ID is found (NO in step S306), the process ends (step S399).

In step S308, the degree-of-importance calculation module 130 calculates the degree of importance. Specifically, the degree-of-importance calculation module 130 calculates the degree of importance by using the degree-of-importance calculation rule stored in the degree-of-importance accumulation module 140 and stores the calculation result in the degree-of-importance accumulation module 140. As the degree-of-importance calculation rule, for example, a degree-of-importance calculation rule table 700 is used. FIG. 7 illustrates an example of a data structure of the degree-of-importance calculation rule table 700. The degree-of-importance calculation rule table 700 includes a point-of-view field 710 and a priority field 720. The point-of-view field 710 stores the point of view (described later). The priority field 720 stores a priority in the point of view.

The degree-of-importance calculation module 130 then stores the calculated degree of importance in, for example, a degree-of-importance calculation result table 800. FIG. 8 illustrates an example of a data structure of the degree-of-importance calculation result table 800. The degree-of-importance calculation result table 800 includes a user ID field 810, a degree-of-importance field 820, an edited portion field 830, and an editing user ID field 840. The user ID field 810 stores a user ID that indicates the previous user (the user A described above) who has edited the edited portion (indicated in the edited portion field 830) last time. The degree-of-importance field 820 stores the degree of importance of the editing of the edited portion (indicated in the edited portion field 830) for the previous user (the user A described above) indicated by the user ID. The edited portion field 830 stores a portion that has been edited. The editing user ID field 840 stores a user ID that indicates a current user (the user B described above) who has edited the edited portion this time. It is assumed in this case that the user A edits a component, and then the user B edits the same component.

An example of the degree-of-importance calculation processing performed by the degree-of-importance calculation module 130 will be described in detail.

The degree-of-importance calculation module 130 determines whether editing that is important for the user A has been performed in accordance with the information stored in the editing log table 500.

Examples of the point of view used to calculate the degree of importance include (1) to (5) listed below. These points of view may be used independently from one another, or the degree of importance may be calculated based on the priority defined in advance in the degree-of-importance calculation rule table 700. In addition, the degree of importance calculation result is stored in the degree-of-importance calculation result table 800 on a per user basis.

(1) Determination Based on Scale of Editing

The larger a proportion of an editing amount in an area of an edited portion, the more important the editing is determined to be.

(2) Determination Based on Frequency of Editing

The higher the frequency of editing or the later the editing timing, the more important the editing is determined to be. The number of times of editing or the number of times of editing in a predetermined period may be used as the frequency of editing.

(3) Determination Based on Way of Editing

The degree of importance is changed depending on the way of editing, such as "depending on whether the body is edited" or "whether an annotation is added as a comment". Editing is determined to be more important in the case where the body of the document is edited in response to a comment than in the case where another comment is added in response to a comment because it is considered that checking whether the pointed-out part is correctly reflected is more important.

(4) Determination Based on Group or Role

Editing performed by a user belonging to the same group as the previous user (user A) or by the previous user's boss is determined to be more important.

(5) Determination Based on Additional Information by Annotation of Document

A reference right may be assigned to an annotation of a document. For example, the reference right of each annotation is managed by using an annotation table 600. FIG. 6 illustrates an example of a data structure of the annotation table 600. The annotation table 600 includes an annotation ID field 610 and an access right field 620. The annotation ID field 610 stores information (annotation ID) for uniquely identifying an annotation in the first exemplary embodiment. The access right field 620 stores an access right assigned to the annotation indicated by the annotation ID. The access right field 620 stores, for example, the user ID and the access right (such as a reference right or an editing right).

In the case where users each having the reference right for an annotation of interest concurrently edit the document, editing related to the annotation is determined to be more important. Alternatively, editing may be determined to be more important on condition that no user not having the reference right for the annotation is participating in the concurrent editing. For example, information that is desirably kept unknown to other groups (information that is written in an annotation and for which users of the other groups do not have the reference right) is determined to be important when no other groups are participating in the collaborative editing and to be a topic of a chat during the collaborative editing.

In step S310, the information processing apparatus 100 determines whether the user indicated by the user ID is currently using the user terminal 220. If the user is currently using the user terminal 220, the process proceeds to step S312; otherwise, the process ends (step S399). Specifically, the information processing apparatus 100 checks whether the user indicated by the user ID obtained in step S306 is online (is collaboratively editing the document). If the user indicated by the user ID is online (YES in step S310), processing of step S312 is performed. If the user indicated by the user ID is not online (NO in step S310), the process ends (step S399).

In step S312, the information processing apparatus 100 controls display of the annotation for the user ID. Specifically, the information processing apparatus 100 displays editing information in an editing outline area 1020 (see FIG. 10) on the user terminal 220 of the online user. The display content may be sorted based on the degree of importance. The user then selects a given part of the editing outline area 1020 by using the user terminal 220. A document area 1010 (see FIG. 10) may be updated (changed) so that the "information for uniquely identifying the edited portion of the document" stored in the editing log table 500 is displayed.

A specific example regarding how a notification based on the degree of importance is made will be described next with reference to FIGS. 9 and 10. In this example, a notification is made by displaying an annotation added to a document of interest. That is, content of the notification is included in the annotation.

Figure 10:
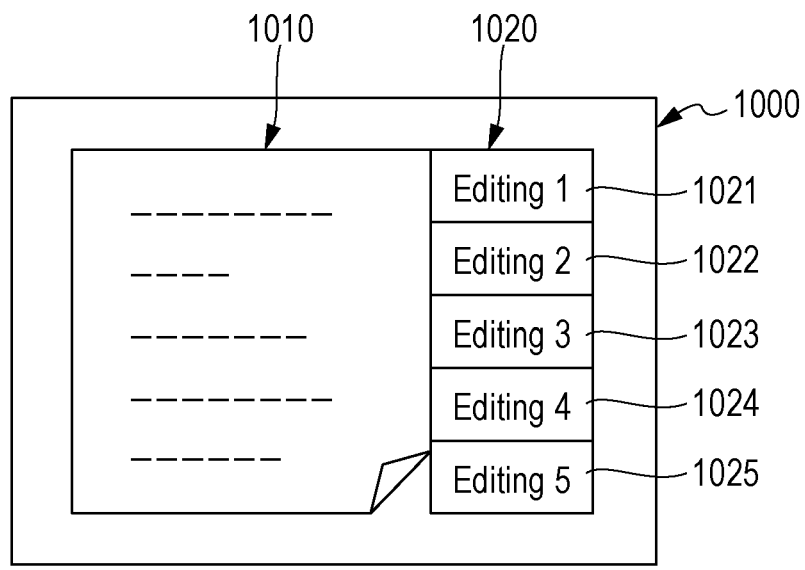
FIG. 10 illustrates an example of a process according to the first exemplary embodiment.

As illustrated in the example in FIG. 10, the document area 1010 that displays content of the document being edited and the editing outline area 1020 that notifies the user of important editing for the user are displayed in a screen 1000 of the display device, such as a liquid crystal display, of the user terminal 220. The example illustrated in FIG. 10 illustrates the case where editing is performed five times, and the editing outline area 1020 displays editing outlines 1021, 1022, 1023, 1024, and 1025, which are annotations. Note that when collaborative editing is started, nothing is displayed in the editing outline area 1020.

The display of the annotations is controlled in accordance with the degree of importance in the editing outline area 1020. For example, the display order or whether to display each annotation is controlled in accordance with the degree of importance.

Figure 9:
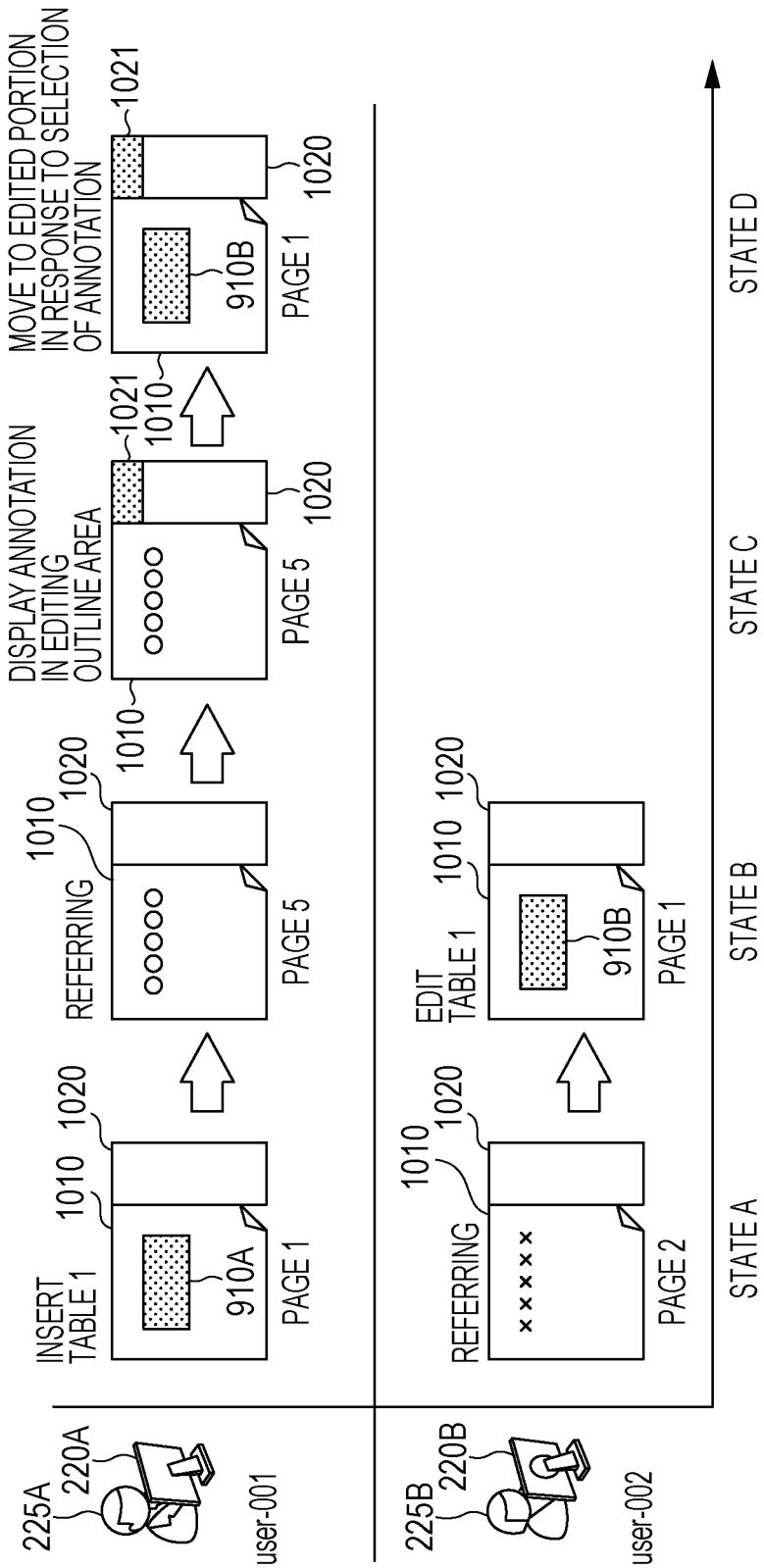
FIG. 9 illustrates an example of a process according to the first exemplary embodiment.

As illustrated in the example in FIG. 9, the users 225A and 225B are collaboratively editing a document by using the user terminals 220A and 220B, respectively. It is assumed that the processing progresses in time series from left to right.

The user 225A "user-001" inserts a table 910A on page 1 of the document (state A).

Then, the user 225A "user-001" refers to page 5 of the document. At that time, the user 225B "user-002" edits the table 910A that has been inserted by the user 225A "user-001" to replace the table 910A with a table 910B (state B).

Then, the degree-of-importance calculation module 130 determines that editing that is important for the user 225A "user-001" has been performed, in accordance with the information managed by the editing log management module 110, and the display content control module 150 displays content of the editing performed by the user 225B "user-002" at the editing outline 1021 of the editing outline area 1020 on the user terminal 220A used by the user 225A "user-001" (state C).

If the user 225A "user-001" selects the editing outline 1021 in the editing outline area 1020, the user 225A "user-001" is able to check the content of the editing performed by the user 225B "user-002" (state D). That is, the page (page 1) including the table 910B (i.e., the table 910A that has been edited by the user 225B "user-002") is displayed.

The display manner of the editing outlines, such as the editing outline 1021 which is an annotation, may be dynamically controlled by sorting them based on the degree of importance or the like. For example, the editing outline having a higher degree of importance may be displayed at an upper position.

The displayed content may be controlled in accordance with the device type (such as a personal computer, a smartphone, or the like) of the user terminal 220. In addition, when the user terminal 220 is offline, a notification regarding important editing may be made by email or the like.

Figure 11:
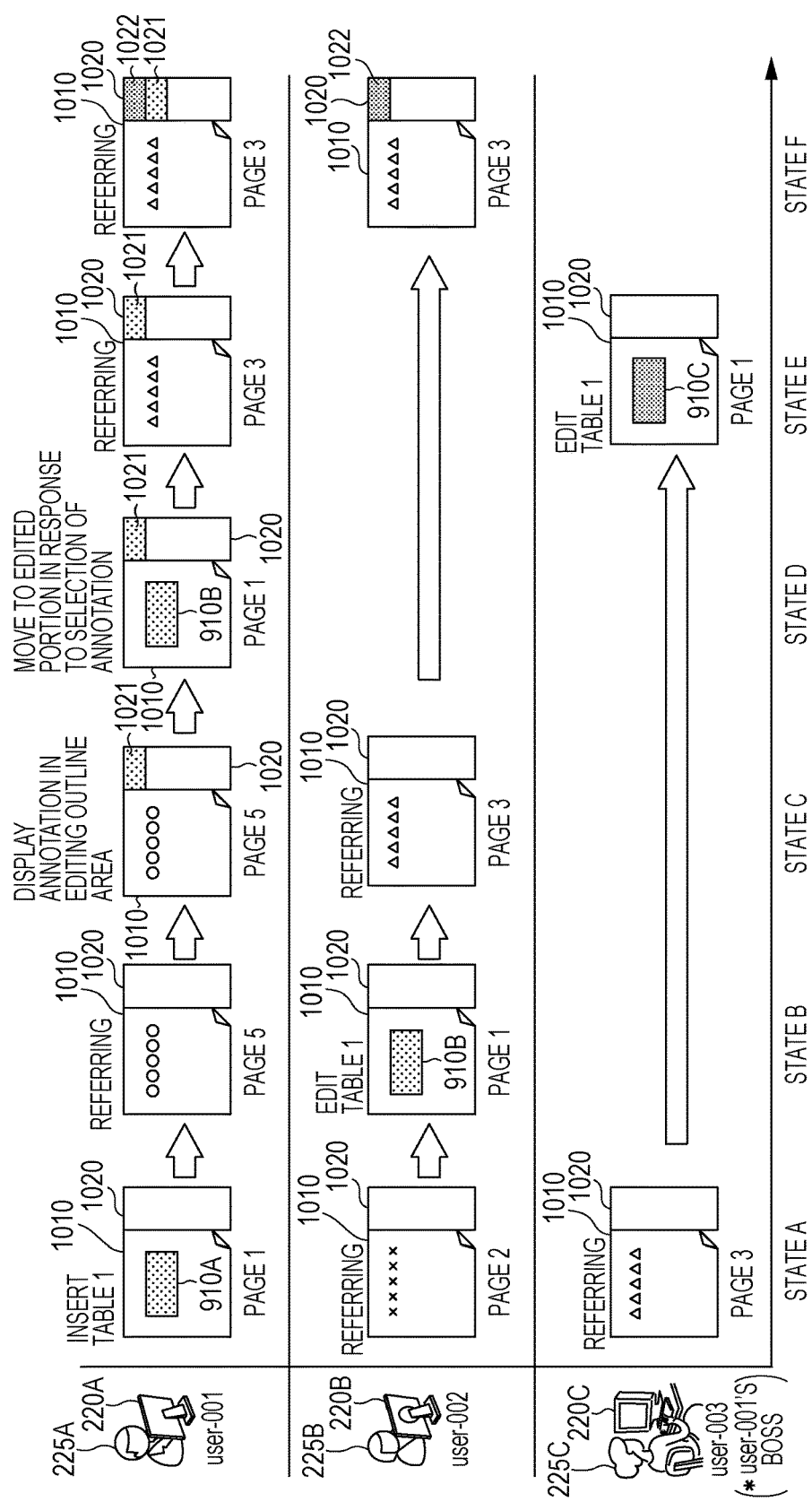
FIG. 11 illustrates an example of a process according to the first exemplary embodiment.

A description will be further given of the case where three users are editing a document of interest with reference to an example illustrated in FIG. 11.

As illustrated in the example in FIG. 11, the users 225A, 225B, and 225C are collaboratively editing a document by using the user terminals 220A, 220B, and 220C, respectively. It is assumed that the user 225C is the user 225A's boss. It is also assumed that operations such as editing performed by the users 225A and 225B up to the state D are substantially the same as those illustrated in the example in FIG. 9.

The user 225C "user-003" edits the table 910B included in the document by using the user terminal 220C to replace the table 910B with a table 910C (state E).

Then, the degree-of-importance calculation module 130 determines that editing that is importance for the users 225A "user-001" and 225B "user-002" has been performed, in accordance with the information managed by the editing log management module 110, and the display content control module 150 displays content of the editing performed by the user 225C "user-003" at the editing outline 1022 of the editing outline area 1020 on the user terminals 220A and 220B used by the users 225A "user-001" and 225B "user-002", respectively (state F).

Since the user 225C "user-003" is the boss of the user 225A "user-001", it is determined that the degree of importance of the editing performed by the user 225C "user-003" is high. Accordingly, control is performed so that the content of editing (editing outline 1022) performed by the user 225C "user-003" is displayed at an upper position than the content of editing (editing outline 1021) performed by the user 225B "user-002" in the editing outline area 1020 on the user terminal 220A used by the user 225A "user-001".

Second Exemplary Embodiment

Figure 12:
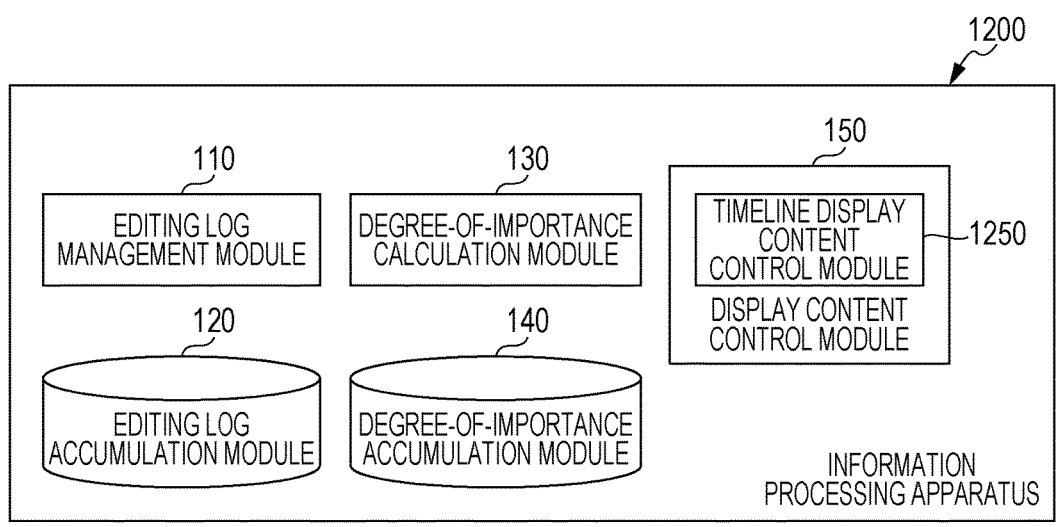
FIG. 12 illustrates an example of a conceptual module configuration according to a second exemplary embodiment.

FIG. 12 illustrates an example of a conceptual module configuration according to a second exemplary embodiment.

An information processing apparatus 1200 is equivalent to the information processing apparatus 100 illustrated in the example in FIG. 1 that additionally includes a timeline display content control module 1250 in the display content control module 150.

Specifically, the information processing apparatus 1200 includes the editing log management module 110, the editing log accumulation module 120, the degree-of-importance calculation module 130, the degree-of-importance accumulation module 140, and the display content control module 150. Note that modules that are substantially the same types as those of the corresponding modules of the first exemplary embodiment are denoted by the same reference signs, and whereby a duplicated description is omitted (the same applies to the following).

The timeline display content control module 1250 performs control so that the editing log of collaborative editing is displayed in a timeline-like manner. The timeline display content control module 1250 controls the display manner of contents subjected to timeline display, in accordance with the degree of importance. The term "timeline" refers to a line along which contents of editing are displayed in time series.

For example, it is assumed that the user 225A "user-001" has signed in at 9:00 on January 21. The timeline display content control module 1250 usually displays contents of editing in ascending or descending order of time by using timeline.

Figure 13:
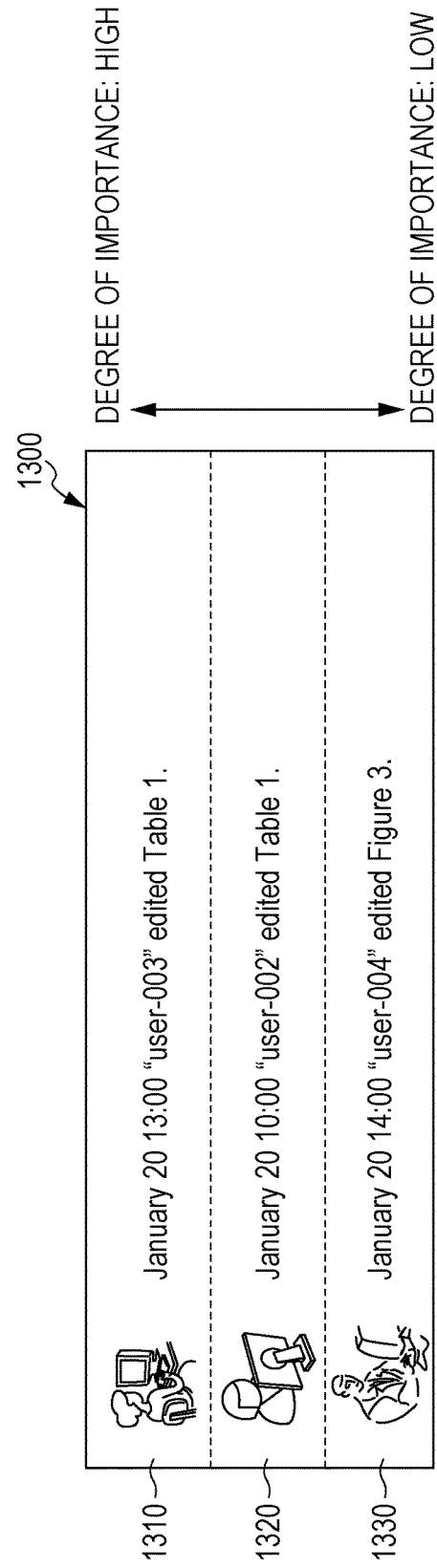
FIG. 13 illustrates an example of a process according to the second exemplary embodiment.

However, when the information processing apparatus 1200 according to the second exemplary embodiment is used, the timeline display content control module 1250 controls display based on the degree of importance by using timeline, in accordance with the degree of importance obtained by the degree-of-importance calculation module 130. For example, as illustrated in FIG. 13, contents of editing 1310, 1320, and 1330 are displayed in descending order of the degree of importance. Note that the contents of editing 1310, 1320, and 1330 are not necessarily displayed in time order. A configuration may be made such that display based on time order or display based on the order of the degree of importance is selectable. In the case of display based on time order, the contents of editing that has been performed within a predetermined period (in units of hours, for example) may be displayed in the order of the degree of importance. Conversely, in the case of display based on the order of the degree of importance, the contents of editing may be displayed in time order when the contents of editing have the same degree of importance.

As a result of the processing performed by the timeline display content control module 1250, the user is easily able to know, at the time of sign-in, whether editing that is important for the user has been performed by another user before the sign-in.

Third Exemplary Embodiment

A third exemplary embodiment will be described next in which the degree of importance is calculated by using location information of users. The third exemplary embodiment has a module configuration substantially the same as those of the first and second exemplary embodiments described above, and the editing log accumulation module 120 and the degree-of-importance calculation module 130 additionally include the following information and processing, respectively.

The editing log accumulation module 120 further stores, as the log information, location information of each user. The location information is information indicating a location which the user is in, for example, information indicating a country or a region.

FIG. 14 illustrates an example of a data structure of an editing log table 1400. The editing log table 1400 includes a user ID field 1410, an editing date/time field 1420, a document ID field 1430, an edited portion field 1440, an editing scale field 1450, and a location field 1460. The editing log table 1400 is equivalent to the editing log table 500 illustrated in the example in FIG. 5 that additionally includes the location field 1460. That is, the editing log table 1400 is stored in the editing log accumulation module 120 according to the first or second exemplary embodiment. The user ID field 1410 stores a user ID. The editing date/time field 1420 stores a date/time at which editing was performed by the user. The document ID field 1430 stores a document ID of a document edited by the user. The edited portion field 1440 stores a portion edited by the user. The editing scale field 1450 stores a scale of editing performed by the user. The location field 1460 stores a location of the user.

FIG. 15 illustrates an example of a data structure of an annotation table 1500. The annotation table 1500 is equivalent to the annotation table 600 illustrated in the example in FIG. 6 that additionally includes a location field 1530. The annotation table 1500 includes an annotation ID field 1510, an access right field 1520, and the location field 1530. The annotation ID field 1510 stores an annotation ID. The access right field 1520 stores an access right assigned to an annotation indicated by the annotation ID. The location field 1530 stores a location of a user who has added the annotation indicated by the annotation ID.

The degree-of-importance calculation module 130 calculates the degree of importance in accordance with a distance between locations. For example, the degree of importance may be changed depending on whether the locations are the same or not.

Specifically, the degree-of-importance calculation module 130 determines the degree of importance based on additional information provided by the annotation of the document.

Editing performed by a user who is in a location near a location in which the user, who has added an annotation to the document, has been is determined to be important. Here, the term "near" may mean the same or substantially the same locations as described above, or it may be determined whether the locations are near by comparing a distance between the locations with a predetermined threshold (specifically, it is determined that the locations are near if the distance is smaller than the predetermined threshold or is smaller than or equal to the predetermined threshold).

For example, in the case where a draft of a product manual of a global product is collaboratively edited, the regulatory compliances differ from country to country, and thus important content also differs from control to country. In such a case, access source country information (location of the user) is assigned to an annotation as in the annotation table 1500. This configuration allows editing performed by a user located in a certain country to be determined to be information that is important for the other users who have made an access from that country.

Fourth Exemplary Embodiment

Figure 16:
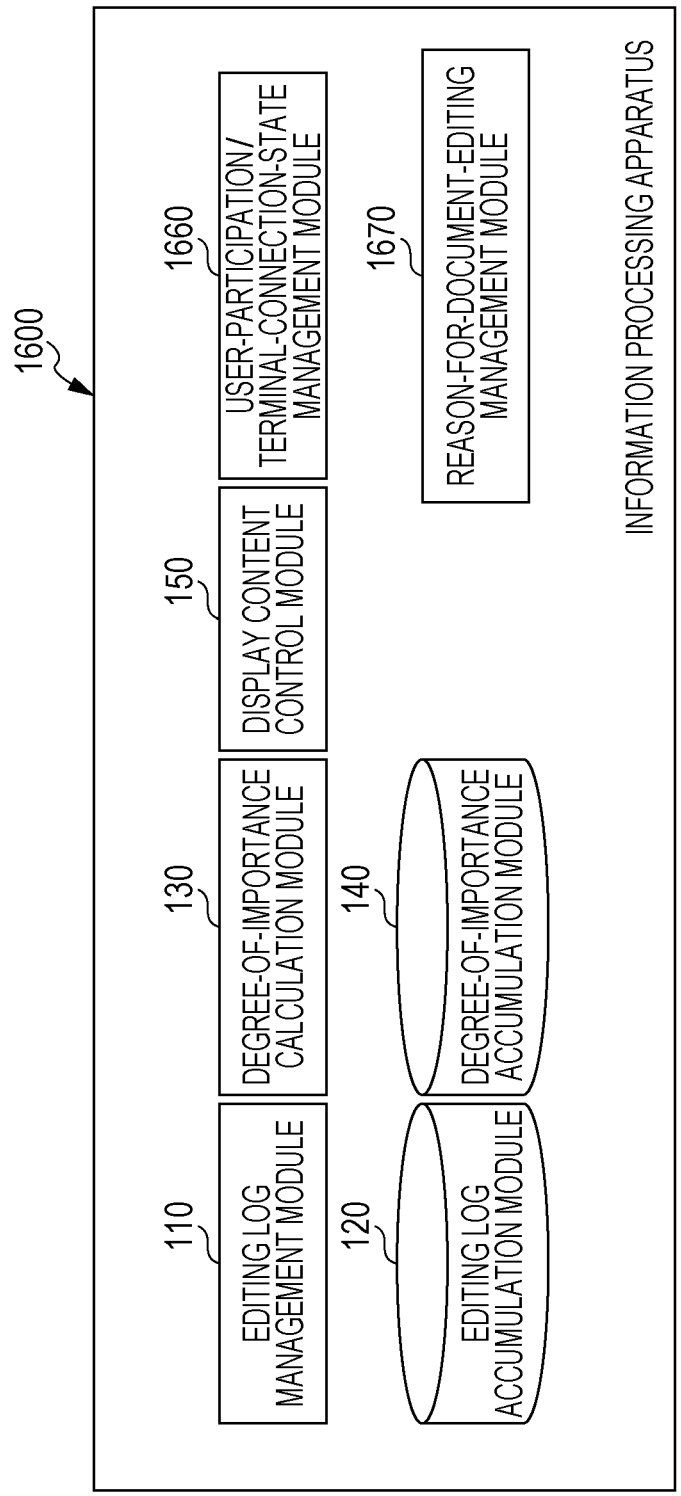
FIG. 16 illustrates an example of a conceptual module configuration according to a fourth exemplary embodiment.

FIG. 16 illustrates an example of a conceptual module configuration according to a fourth exemplary embodiment.

An information processing apparatus 1600 includes the editing log management module 110, the editing log accumulation module 120, the degree-of-importance calculation module 130, the degree-of-importance accumulation module 140, the display content control module 150, a user-participation/terminal-connection-state management module 1660, and a reason-for-document-editing management module 1670. The information processing apparatus 1600 is equivalent to the information processing apparatus 100 according to the first exemplary embodiment additionally including the user-participation/terminal-connection-state management module 1660 and the reason-for-document-editing management module 1670. Needless to say, the user-participation/terminal-connection-state management module 1660 and the reason-for-document-editing management module 1670 may be additionally included in the information processing apparatus according to the second or third exemplary embodiment.

The user-participation/terminal-connection-state management module 1660 detects whether the user is in a document-editable situation. Examples of the "document-editable situation" include a situation where the user is participating in (for example, has signed in to) a system (hereinafter, also referred to as a "collaborative editing system") that allows plural users to create a document. Hereinafter, the "document-editable situation" is also referred to as a situation where the user is online. In addition, examples of the "document-not-editable situation" include a situation where the user is not participating in the collaborative editing system (for example, has temporarily left or has signed out) and a situation where a user terminal 220 used by the user is unable to communicate with the collaborative editing system because the user terminal 220 is out of order or powered off or because of a failure in the communication line. Hereinafter, the "document-not-editable situation" is also referred to as a situation where the user is offline. The situation where the user has temporarily left may be detected when the user has shown an intention to temporarily leave (for example, has pressed a "temporarily leave" button). In addition to such a case, the user terminal 220 used by the user may include a camera or the like, and the situation where the user has temporarily left may be detected by determining whether the user is in front of the user terminal 220 by using the camera or the like.

In addition to detecting whether the user is participating in the collaborative editing system, the user-participation/terminal-connection-state management module 1660 may detect whether communication to the user terminal 220 used by the user is available, whether the user terminal 220 used by the user is powered off, and whether the user is present by analyzing an image captured by the camera of the user terminal 220 (an image of a position at which the user terminal 220 is used).

In the case where the user B edits a document while the user A is in the document-not-editable situation (e.g., while the user A is not editing the document), the reason-for-document-editing management module 1670 outputs an indication to prompt the user B to store (input) the reason for the editing before the user B is in the document-not-editable situation (e.g., after the user B finishes editing the document). Needless to say, the users A and B are different persons. "Before the user B is in the document-not-editable situation" is typically before the user B shows an intention to stop participating in the collaborative editing system (such as temporal leave or sign-out). Specifically, "before the user B is in the document-not-editable situation" is before a sing-out instruction is accepted. Such a timing may be any timing after the user B has edited the target portion, and may be, for example, a timing immediately after the user has performed the editing. In addition, the reason for the editing input by the user B is stored by the editing log management module 110 in the editing log accumulation module 120. The indication may be output by displaying a message on a display device, outputting sound from a sound output device such as a speaker, printing a message using a printing apparatus such as a printer, vibrating, or any selective combination thereof.

The reason-for-document-editing management module 1670 may output an indication to prompt the user B to store (input) the reason for the editing if the editing made by the user B is important for the user A. Here, "the case where the editing is important for the user A" may at least include the case where a portion that has been edited by the user A is further edited by the user B. In addition, "the case where the editing is important for the user A" may be the case where the degree of importance calculated by the degree-of-importance calculation module 130 is higher than or is higher than or equal to a predetermined threshold.

The reason-for-document-editing management module 1670 may output the indication of the reason for the editing of the document upon the user A being in the document-editable situation (e.g., upon the user A starting editing the document). The expression "upon the user A being in the document-editable situation" indicates that the user A has recovered from the "document-not-editable situation" described above. Examples of such a timing include when the user A signs in, when the user returns to their desk, when the user terminal is powered on, and when the communication network is recovered.

Figure 17:
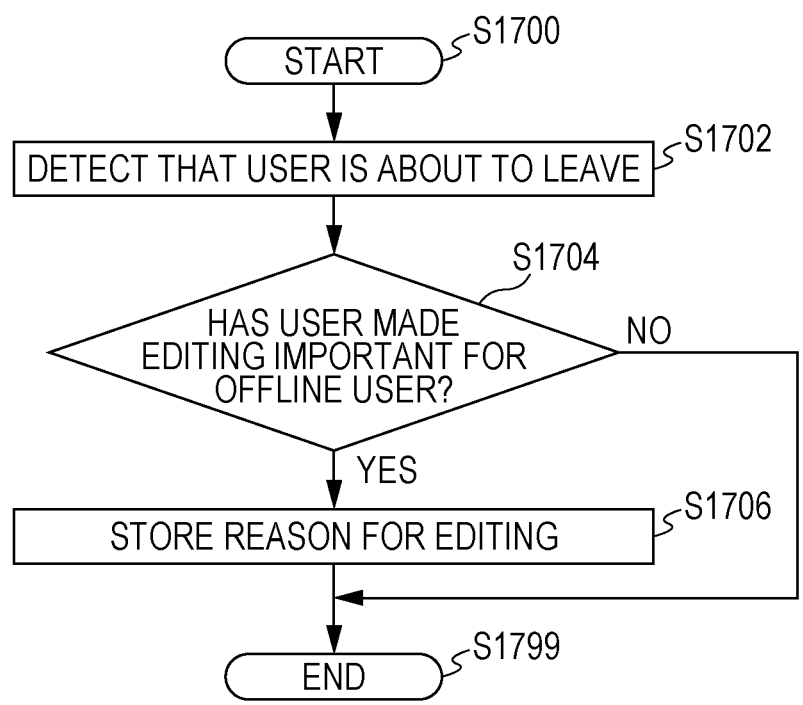
FIG. 17 is a flowchart illustrating an example of a process according to the fourth exemplary embodiment.

FIG. 17 is a flowchart illustrating an example of a process according to the fourth exemplary embodiment.

The process starts in S1700. In step S1702, the user-participation/terminal-connection-state management module 1660 detects that the user B is about to leave. Examples of "leaving" include temporal leave and sign-out. Specifically, the user-participation/terminal-connection-state management module 1660 detects acceptance of a sign-out instruction as described before.

In step S1704, the reason-for-document-editing management module 1670 determines whether the user B has performed editing that is important for the user A who is offline. If the user B has performed editing that is important for the user A, the process proceeds to step S1706; otherwise, the process ends (step S1799).

Figure 18:
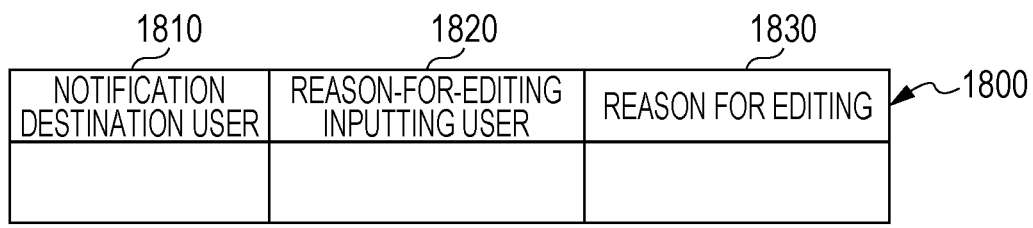
FIG. 18 illustrates an example of a data structure of a reason-for-editing table.

In step S1706, the reason-for-document-editing management module 1670 outputs an indication to prompt the user B to store (input) the reason for the editing made on a portion of interest in the document and stores the reason for the editing. For example, the reason-for-document-editing management module 1670 generates a reason-for-editing table 1800. FIG. 18 illustrates an example of a data structure of the reason-for-editing table 1800. The reason-for-editing table 1800 includes a notification-destination-user field 1810, a reason-for-editing-inputting-user field 1820, and a reason-for-editing field 1830. The notification-destination-user field 1810 stores information indicating a user who is to be notified. In this case, the user who is to be notified is the user A. The reason-for-editing-inputting-user field 1820 stores information indicating a user who has input the reason for the editing. In this case, the user who has input the reason for the editing is the user B. The reason-for-editing field 1830 stores the reason for the editing input by the user B. The reason-for-editing field 1830 may further store a flag indicating whether the reason for the editing has been shown.

Figure 19:
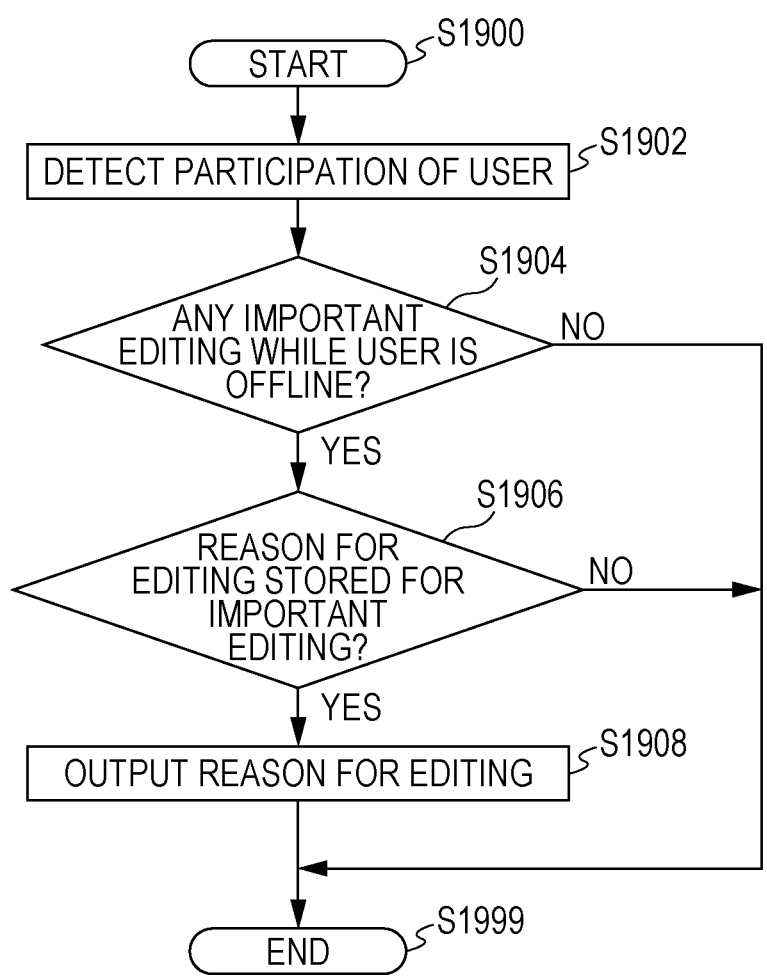
FIG. 19 is a flowchart illustrating an example of a process according to the fourth exemplary embodiment.

FIG. 19 is a flowchart illustrating an example of a process according to the fourth exemplary embodiment.

The process starts in step S1900. In step S1902, the user-participation/terminal-connection-state management module 1660 detects participation of the user A.

In step S1904, the reason-for-document-editing management module 1670 determines whether important editing has been made while the user A has been offline. If important editing has been made, the process proceeds to step S1906; otherwise, the process ends (step S1999).

In step S1906, the reason-for-document-editing management module 1670 determines whether the reason for editing is stored for the editing. If the reason for editing is stored, the process proceeds to step S1908; otherwise, the process ends (step S1999). Here, it may be determined whether there is a reason for editing for which an indication is yet to be output.

In step S1908, the reason-for-document-editing management module 1670 outputs an indication about the reason for the editing to (the user terminal 220 of) the user A.

Figure 20:
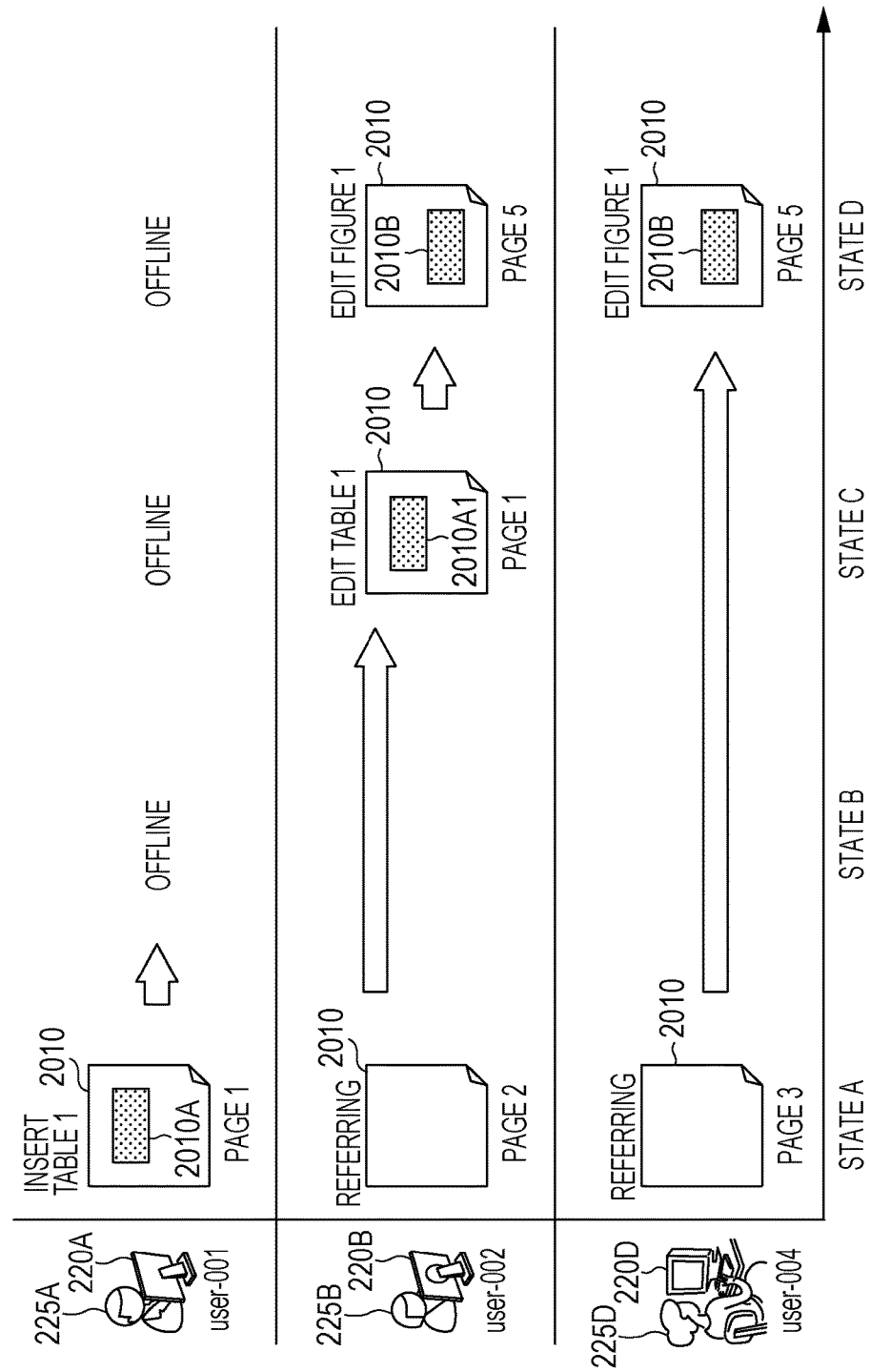
FIG. 20 illustrates an example of a process according to the fourth exemplary embodiment.
Figure 21:
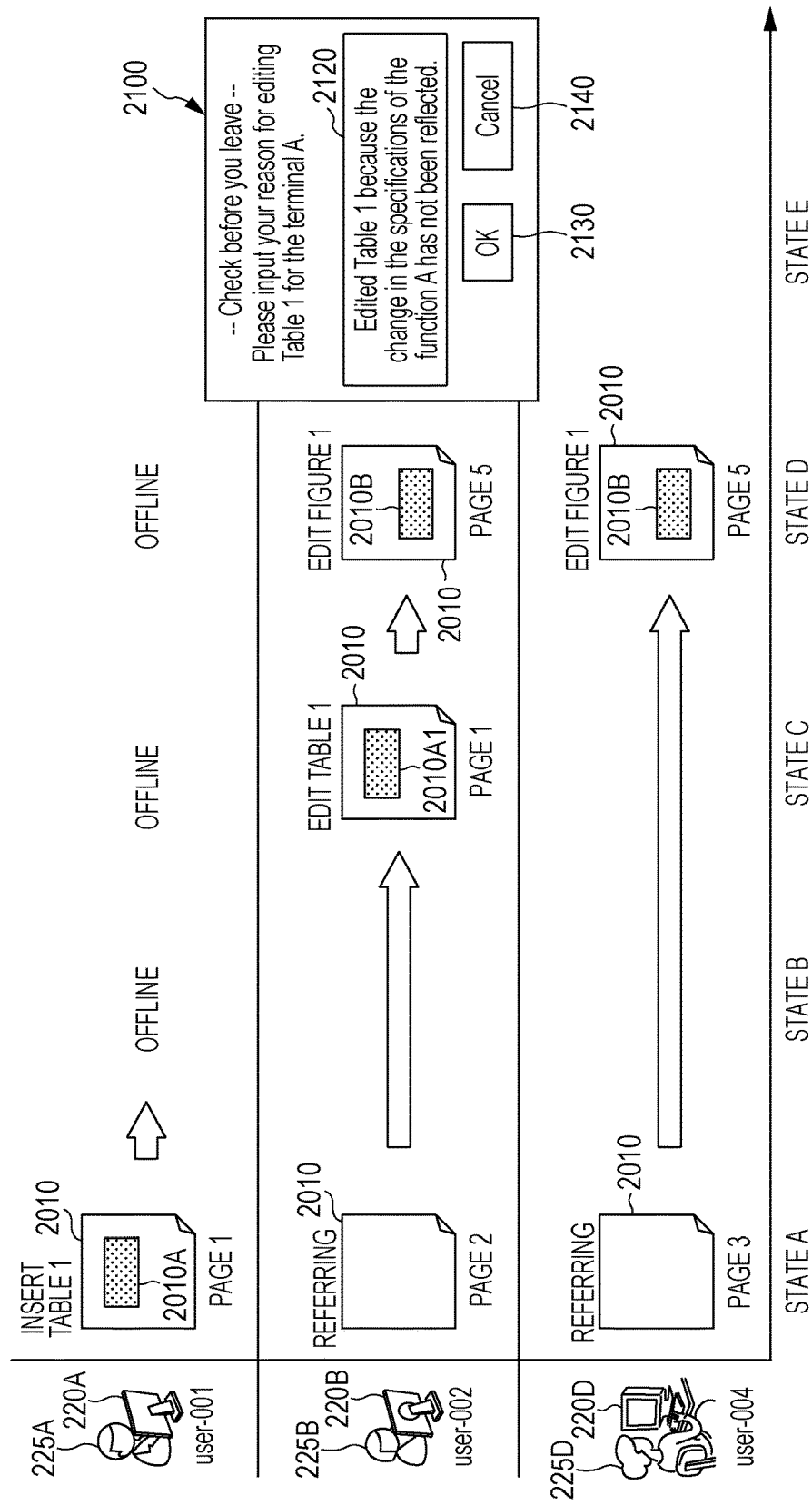
FIG. 21 illustrates an example of a process according to the fourth exemplary embodiment.
Figure 22:
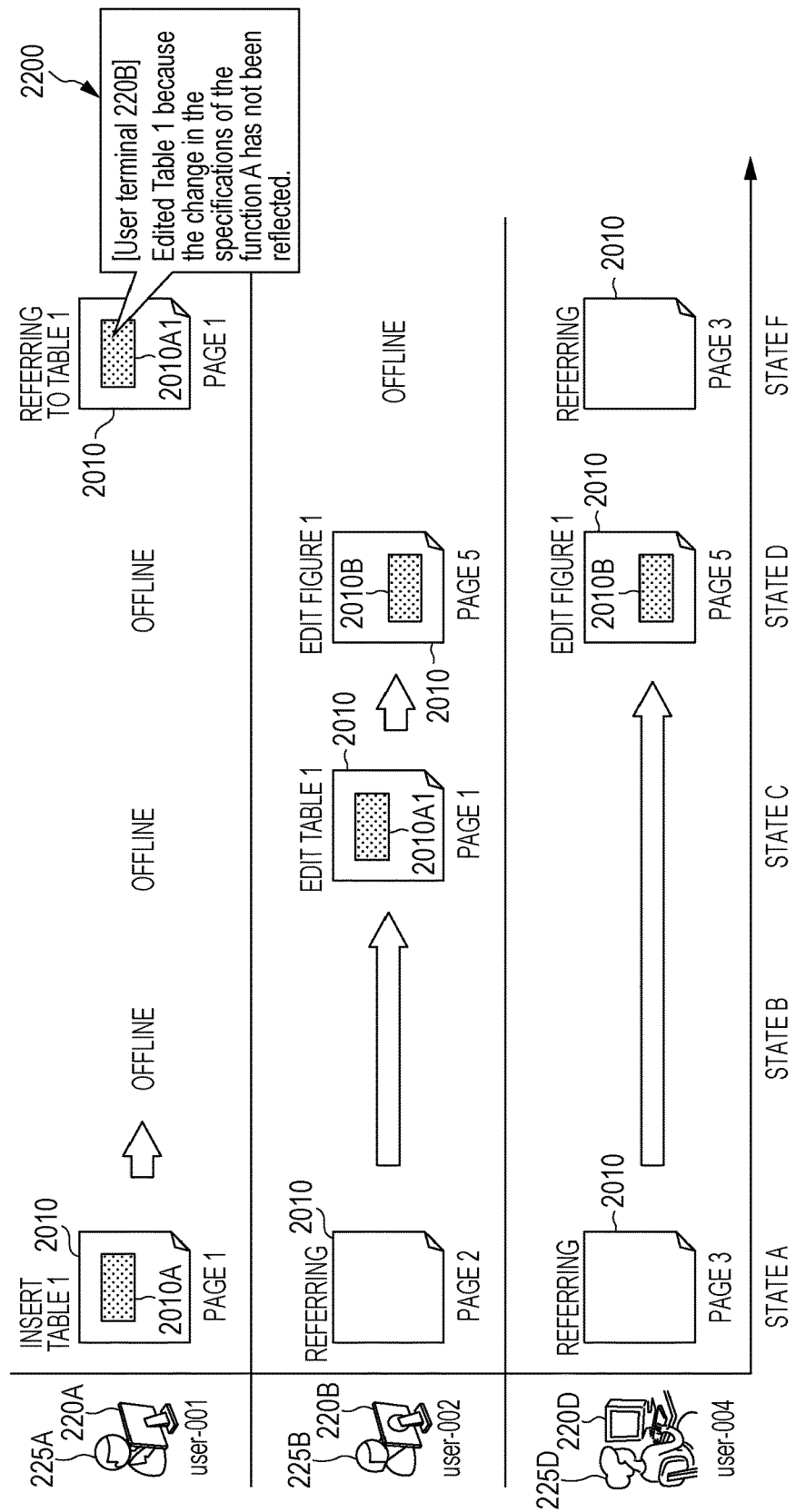
FIG. 22 illustrates an example of a process according to the fourth exemplary embodiment.

FIGS. 20 to 22 illustrate an example of the process according to the fourth exemplary embodiment.

As illustrated in the example in FIG. 20, the users 225A, 225B, and 225D are collaboratively editing a document 2010 by using the user terminals 220A, 220B, and 220D, respectively.

The user 225A "user-001" inserts a table 2010A on page 1 of the document 2010 (state A).

Then, the user 225A "user-001" signs out from the collaborative editing system. That is, the user 225A becomes offline (state B).

Then, the user 225B "user-002" edits (modifies) the table 2010A on page 1 of the document 2010 to a table 2010A1 (state C). At this point, the user 225A is offline.

Then, the user 225B "user-002" and the user 225D "user-004" use a discussion function (chat function), which is one of the functions of the collaborative editing system, and the user 225B "user-002" edits a figure 2010B on page 5 of the document 2010 (state D). At this point, the user 225A is offline.

Thereafter, the user 225B "user-002" inputs an instruction to sign out from the collaborative editing system as illustrated in an example in FIG. 21. Before the user 225B signs out, a screen 2100 for inputting the reason for the editing is displayed on the display device of the user terminal 220B. The screen 2100 for inputting the reason for the editing includes an input area 2120, an OK button 2130, and a cancel button 2140. For example, a message "—Check before you leave—Please input your reason for the editing of the table 2010A1 for the terminal A (user 225A "user-001")." is displayed in the screen 2100 for inputting the reason for the editing to prompt the user 225B "user-002" to input the reason for the editing in the input area 2120 (state E). The screen 2100 for inputting the reason for the editing is displayed because the user 225B has edited the table 2010A previously edited by the user 225A who is now offline while the user 225A has been offline. In addition, the screen 2100 for inputting the reason for the editing may be displayed when the degree of importance of the editing made by the user 225B while the user 225A has been offline is higher than or is higher than or equal to a predetermined threshold.

The user 225B "user-002" inputs, for example, "Edited the table 2010A1 because the change in the specifications of the function A has not been reflected." as the reason for the editing in the input area 2120 and presses the OK button 2130. If the user 225B skips to input the reason for the editing, the user 225B presses the cancel button 2140.

After inputting the reason for the editing, the user 225B "user-002" signs out from the collaborative editing system and becomes offline.

Thereafter, the user 225A "user-001" signs in to the collaborative editing system and becomes online as illustrated in the example in FIG. 22. The user 225A "user-001" displays page 1 of the document 2010 (state F). Note that FIG. 22 omits illustration of the state E.

Upon display of page 1 of the document 2010, a reason-for-editing display area 2200 is displayed in the vicinity of the table 2010A1. The reason for the editing input in the state E ("Edited the table 2010A1 because the change in the specifications of the function A has not been reflected.") is displayed in the reason-for-editing display area 2200.

Note that if the reason for editing is stored for the user 225A "user-001", the corresponding portion and the reason-for-editing display area 2200 may be displayed after the user 225A "user-001" has signed in to the collaborative editing system.

Fifth Exemplary Embodiment

In a fifth exemplary embodiment, the reason-for-document-editing management module 1670 additionally performs the following processing in the above-described module configuration according to the fourth exemplary embodiment.

If the user B is in the document-editable situation (e.g., the user B is editing the document), the reason-for-document-editing management module 1670 outputs an indication of a log for a period including a time point at which the user B has made the editing. Specifically, the reason-for-document-editing management module 1670 extracts a log before and after a timing at which the editing important for the user A has been made and outputs an indication of the log.

Figure 23:
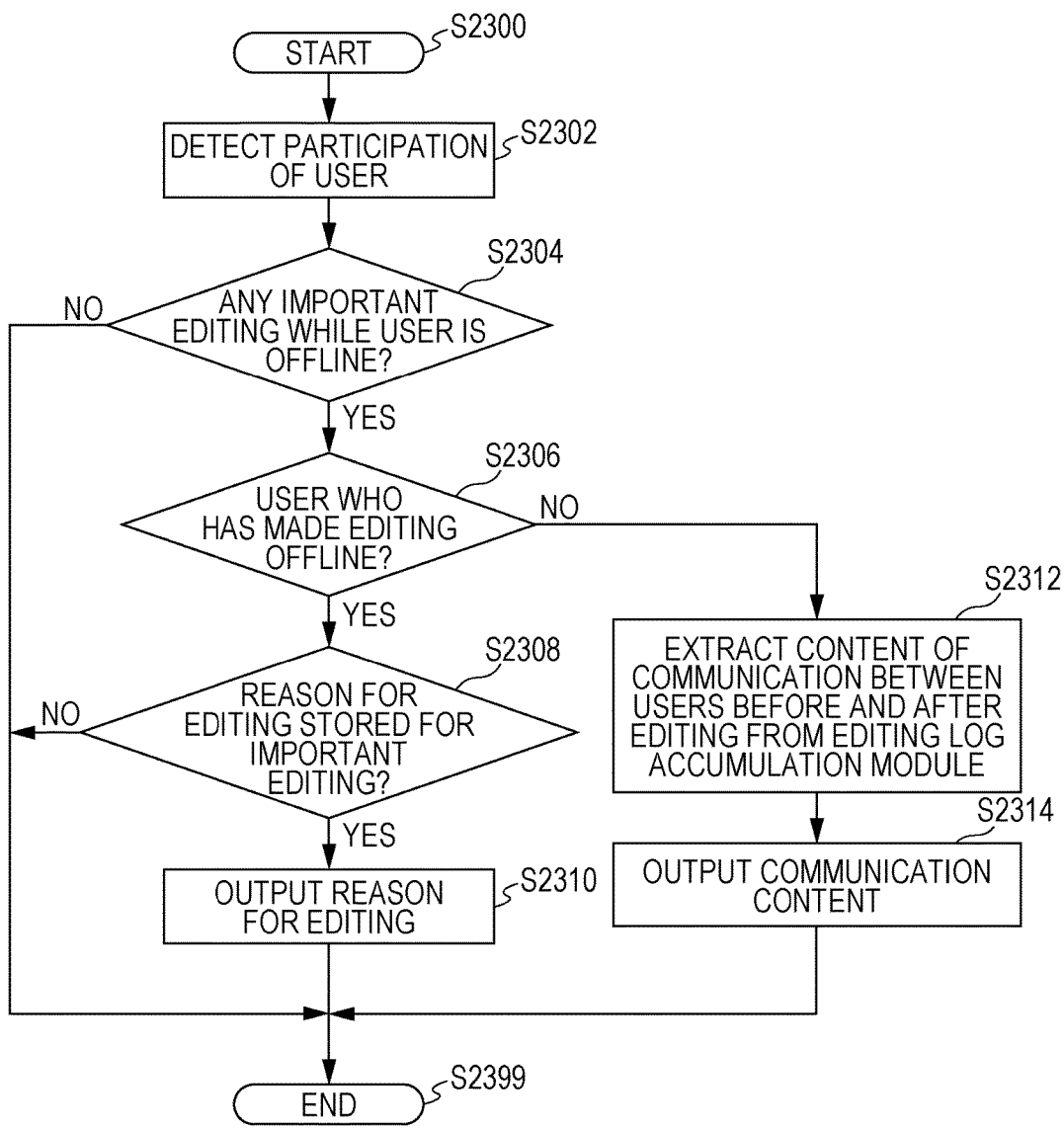
FIG. 23 is a flowchart illustrating an example of a process according to a fifth exemplary embodiment.

FIG. 23 is a flowchart illustrating an example of a process according to the fifth exemplary embodiment. FIG. 23 corresponds to the flowchart illustrated in the example in FIG. 19. Different processing is performed depending on whether the user B is offline or online when the user A who has been offline becomes online.

The process starts in step S2300. In step S2302, the user-participation/terminal-connection-state management module 1660 detects participation of the user A.

In step S2304, the reason-for-document-editing management module 1670 determines whether important editing has been performed while the user A has been offline. If such editing has been performed, the process proceeds to step S2306; otherwise, the process ends (step S2399).

In step S2306, the reason-for-document-editing management module 1670 determines whether the user B who has made the editing is offline. If the user B is offline, the process proceeds to step S2308; otherwise the process proceeds to S2312.

In step S2308, the reason-for-document-editing management module 1670 determines whether the reason for the editing is stored in association with the editing. If the reason for the editing is stored, the process proceeds to step S2310; otherwise, the process ends (step S2399).

In step S2310, the reason-for-document-editing management module 1670 outputs an indication of the reason for the editing.

In step S2312, the editing log management module 110 extracts communication content between the users before and after the editing from the editing log accumulation module 120. That is, the editing log management module 110 extracts a log for a period including the time point at which the important editing was performed because editing and content of communication with other users, which may be a reason for the important editing, may be found in this period. This period may be a period starting from the time point at which the important editing was performed, a period up to the time point at which the important editing was performed, or a period including a predetermined "a" period up to the important editing and a predetermined "b" period starting from the important editing (durations of the "a" period and the "b" period may be the same or different).

In step S2314, the reason-for-document-editing management module 1670 outputs an indication of the communication content extracted in step S2312. Note that the displayed content may include details of editing as well as the communication content.

Figure 24:
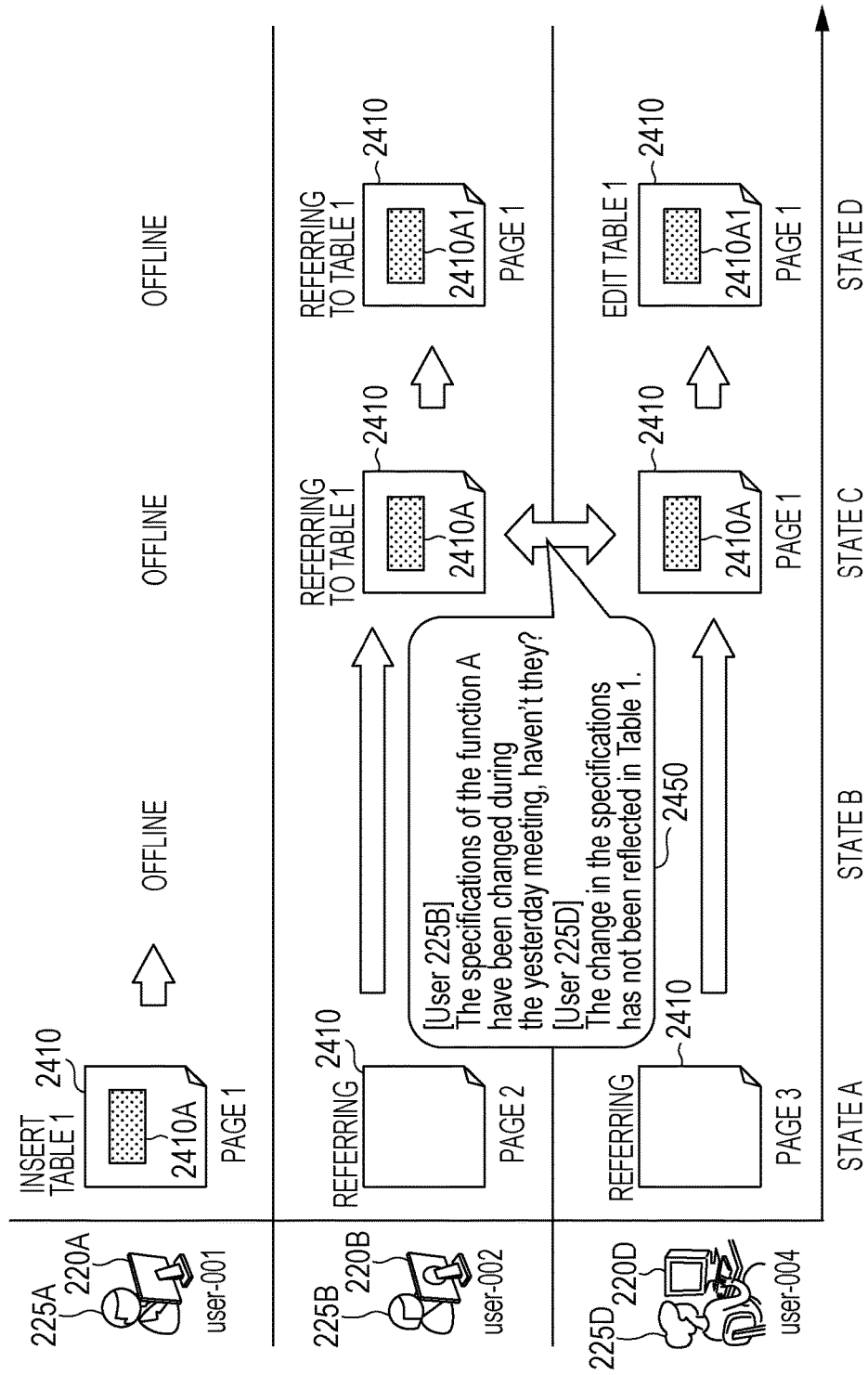
FIG. 24 illustrates an example of a process according to the fifth exemplary embodiment.
Figure 25:
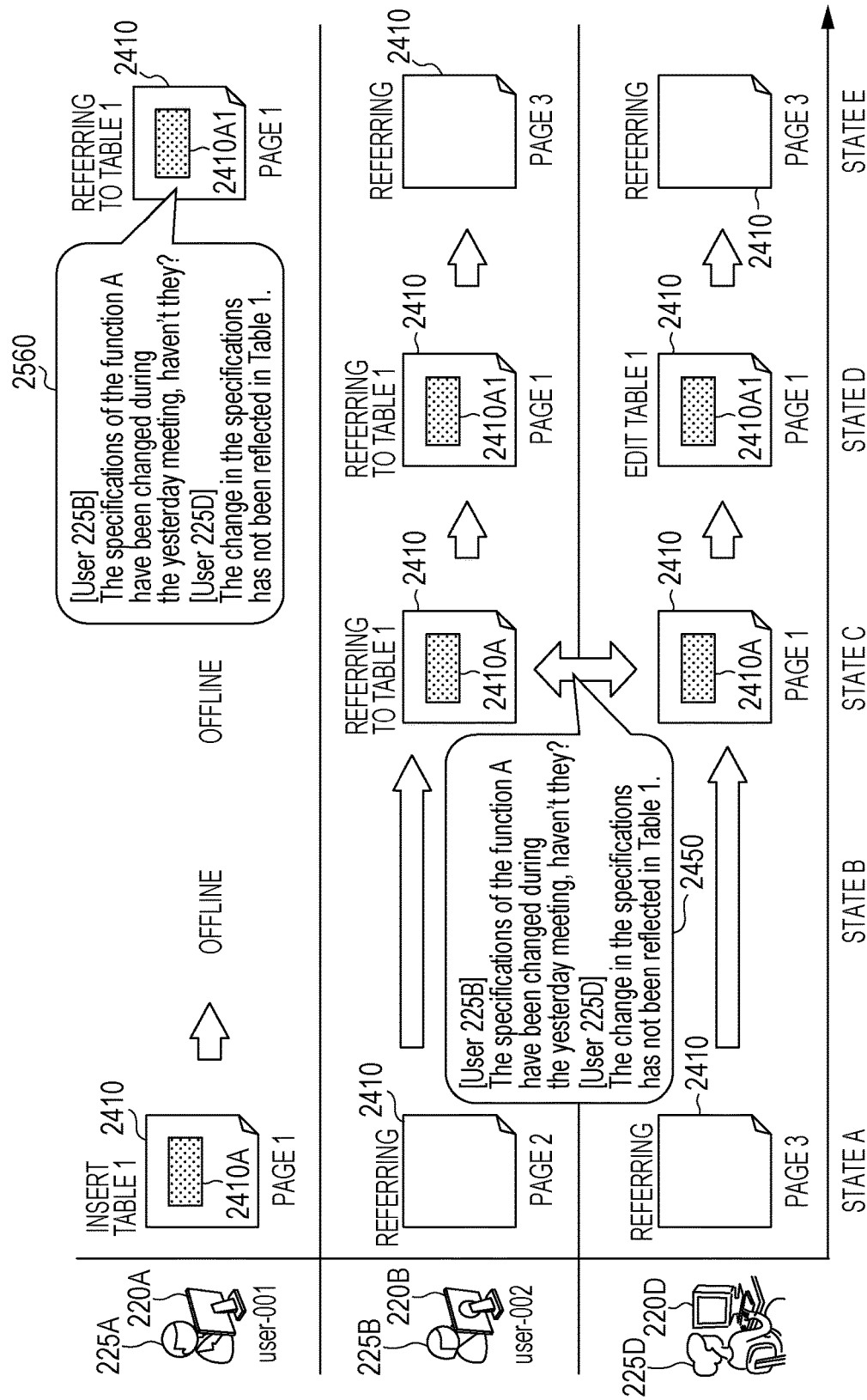
FIG. 25 illustrates an example of a process according to the fifth exemplary embodiment.

FIGS. 24 and 25 illustrate an example of a process according to the fifth exemplary embodiment.

As illustrated in an example in FIG. 24, the users 225A, 225B, and 225D are collaboratively editing a document 2410 by using the user terminals 220A, 220B, and 220D, respectively.

The user 225A "user-001" inserts a table 2410A on page 1 of the document 2410 (state A).

Then, the user 225A "user-001" signs out from the collaborative editing system. That is, the user 225A becomes offline (state B).

Then, the user 225B "user-002" and the user 225D "user-004" communicate with each other (communication content 2450). For example, the users 225B and 225D have a conversation (chat) "[user 225B]: The specifications of the function A have been changed during the yesterday meeting, haven't they?" [user 225D]: I think the change in the specifications has not been reflected in Table 1.", and such communication content 2450 is stored as the log (state C). For example, a communication content field is added to the editing log table 500 illustrated in FIG. 5, and the communication content 2450 is stored therein together with the date/time at which the communication has taken place. At this point, the user 225A is offline.

After the communication corresponding to the communication content 2450 has been performed, the user 225D "user-004" edits (modifies) the table 2410A on page 1 of the document 2410 to a table 2410A1 (state D). At this point, the user 225A is offline.

Thereafter, as illustrated in the example in FIG. 25, the user 225A "user-001" signs in to the collaborative editing system and becomes online (state E). At this point, the user 225D is online.

Upon display of page 1 of the document 2410, a communication content display area 2560 is displayed in the vicinity of the table 2410A1. The communication content 2450 stored in the state C is displayed in the communication content display area 2560. For example, content of the conversation (chat) "[user 225B]: The specifications of the function A have been changed during the yesterday meeting, haven't they?" [user 225D]: I think the specification change has not been reflected in Table 1." is displayed in the communication content display area 2560.

Note that if important editing is made while the user 225A "user-001" is offline, the edited portion may be displayed and the communication content display area 2560 may be displayed after the user 225A "user-001" signs in to the collaborative editing system.

The examples have been described in which the communication content 2450 for a period before the entry to the state D is stored and displayed; however, the communication content in a period after the entry to the state D may be stored and displayed, or the communication content in a period before and after the entry to the state D may be stored and displayed.

Sixth Exemplary Embodiment

In a sixth exemplary embodiment, the reason-for-document-editing management module 1670 additionally performs the following processing in the above-described module configuration according to the fifth exemplary embodiment.

If a request is made by the user A after an indication of the log has been output, the reason-for-document-editing management module 1670 outputs an indication of a portion that has been edited to (the terminal of) the user B. The user A is sometimes unable to understand the reason for the editing only from the content of communication performed in a period including the timing at which the important editing was made. Accordingly, the user A contacts the user B who has made the editing by using the discussion function (chat function), which is one of functions of the collaborative editing system. At that time, the edited portion is displayed on the user terminals 220 of both users in order to make it easier for the users to have the conversation.

Figure 26:
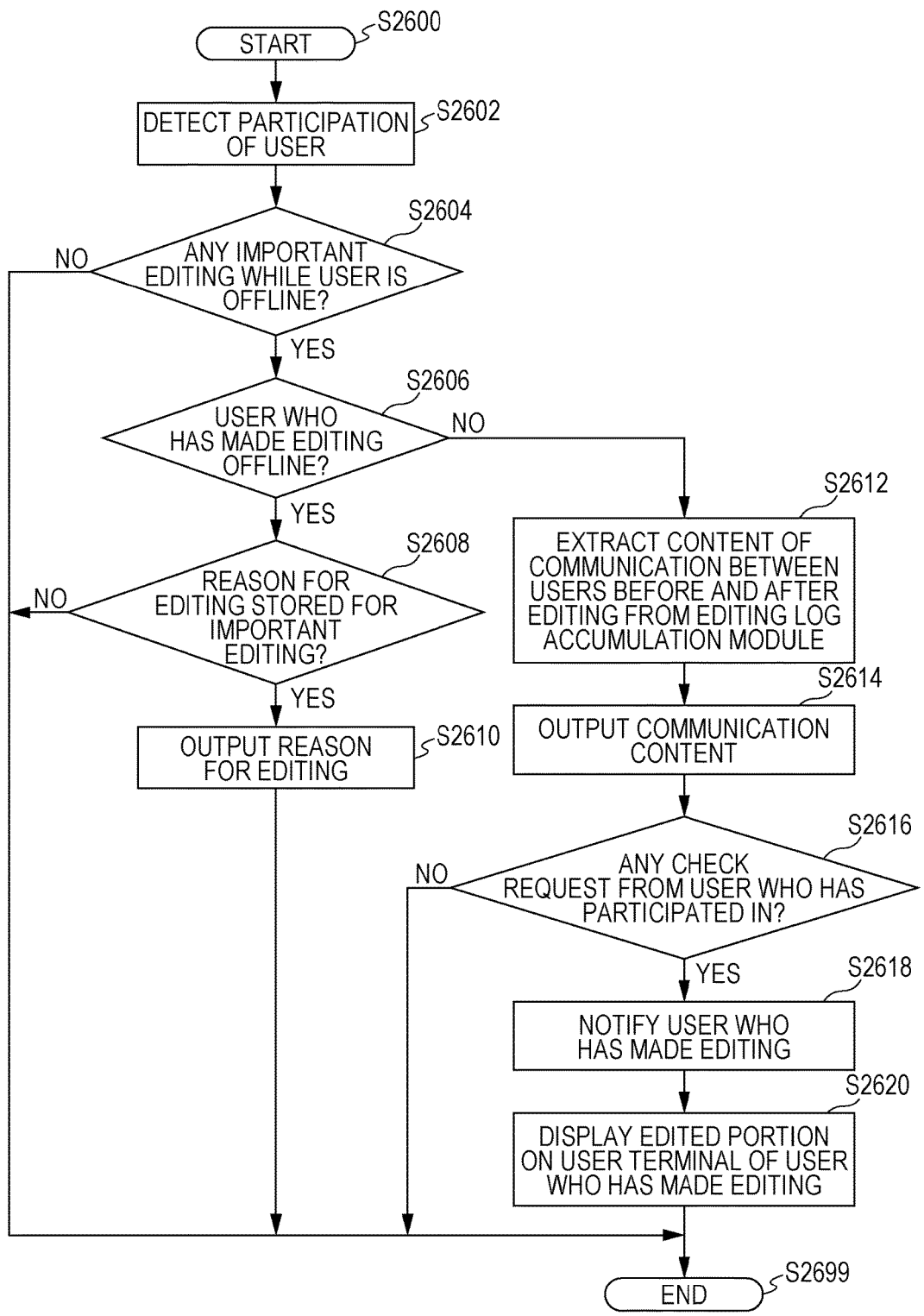
FIG. 26 is a flowchart illustrating an example of a process according to a sixth exemplary embodiment.

FIG. 26 is a flowchart illustrating an example of a process according to the sixth exemplary embodiment.

The flowchart illustrated in the example in FIG. 26 is equivalent to the flowchart illustrated in the example in FIG. 23 additionally including processing starting from step S2616.

The process starts in step S2600. In step S2602, the user-participation/terminal-connection-state management module 1660 detects participation of the user A.

In step S2604, the reason-for-document-editing management module 1670 determines whether important editing has been made while the user A has been offline. If important editing has been made, the process proceeds to step S2606; otherwise, the process ends (step S2699).

In step S2606, the reason-for-document-editing management module 1670 determines whether the user B who has made the editing is offline. If the user B is offline, the process proceeds to step S2608; otherwise, the process proceeds to step S2612.

In step S2608, the reason-for-document-editing management module 1670 determines whether the reason for the editing is stored for the editing. If the reason for the editing is stored, the process proceeds to step S2610; otherwise, the process ends (step S2699).

In step S2610, the reason-for-document-editing management module 1670 outputs an indication of the reason for the editing.

In step S2612, the editing log management module 110 extracts content of communication performed between the users before and after the editing from the editing log accumulation module 120.

In step S2614, the reason-for-document-editing management module 1670 outputs the communication content.

In step S2616, it is determined whether there is a check request from the user A who has participated in. If there is a check request, the process proceeds to step S2618; otherwise, the process ends (step S2699).

In step S2618, the user B who has made the editing is notified of the check request.

In step S2620, the edited portion is displayed on the user terminal 220 used by the user B who has made the editing. Thereafter, the users A and B have a conversation about the reason for the editing.

Figure 27:
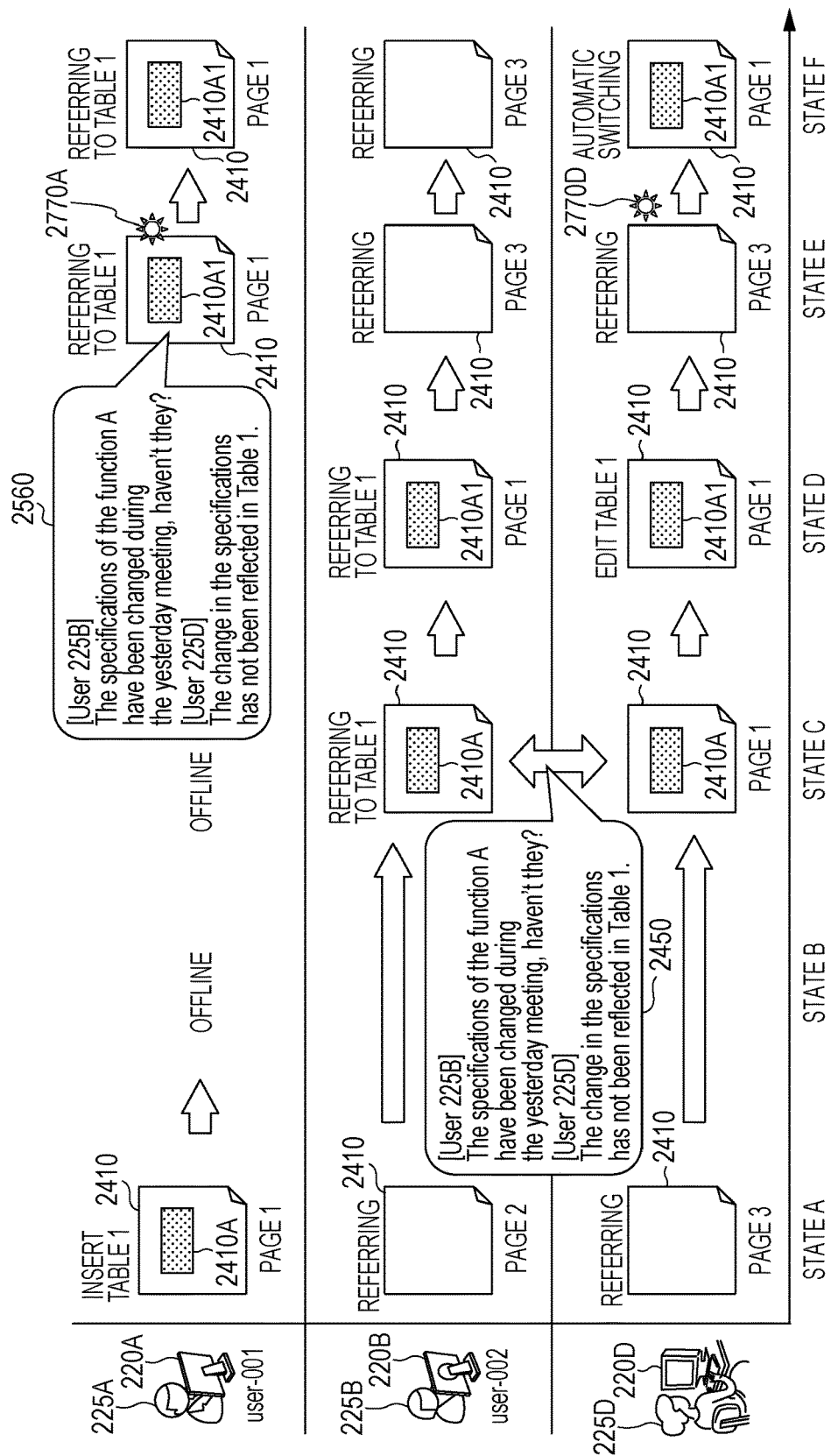
FIG. 27 illustrates an example of a process according to the sixth exemplary embodiment.

FIG. 27 illustrates an example of a process according to the sixth exemplary embodiment.

Operations up to the state E are substantially the same as those in the example in FIG. 25; however, a check-later mark 2770A is displayed in the vicinity of the table 2410A1 on the display device of the user terminal 220A. In addition, a check-later mark 2770D is displayed also on the display device of the user terminal 220D. The check-later mark 2770D is a notification indicating that there may be an inquiry from the user terminal 220A. However, at this point, page 3 of the document 2410 is displayed on the display device of the user terminal 220D. It is assumed that the check-later mark 2770A is pressed by the user 225A.

Then, the display device of the user terminal 220D changes the displayed page of the document 2410 from page 3 to page 1. The page including the table 2410A1 which is the edited portion is also displayed on the user terminal 220D in addition to the user terminal 220A to make it easier for the users to have a conversation about the reason for the editing of the table 2410A1.

Figure 28:
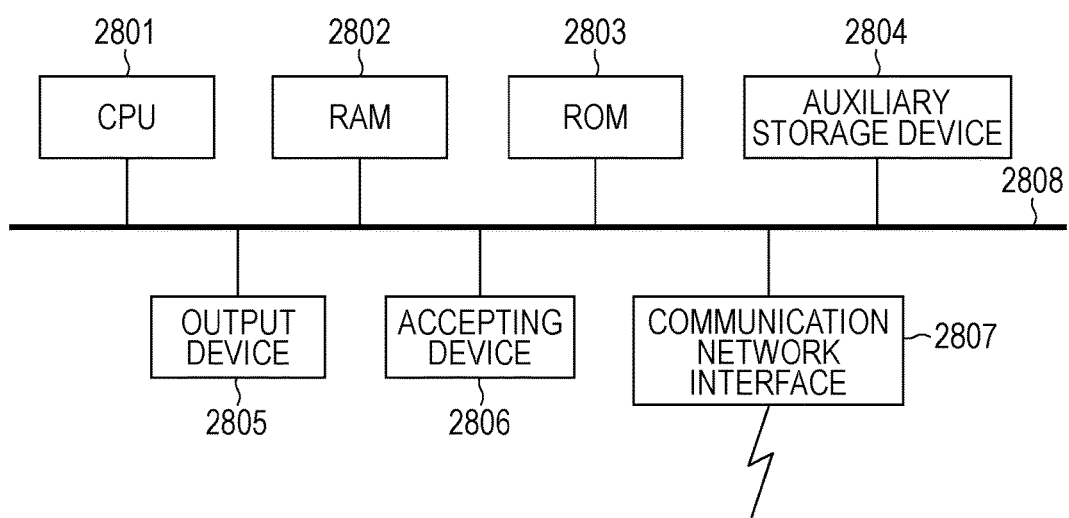
FIG. 28 is a block diagram illustrating an example of a hardware configuration of a computer with which the exemplary embodiments are implemented.

The hardware configuration of a computer that executes a program according to the exemplary embodiments is substantially the same as that of a common computer as illustrated in FIG. 28. Specifically, the computer may be a personal computer or a server computer, for example. That is, in a specific example, a CPU 2801 is used as a processor (computing unit), and a RAM 2802, a ROM 2803, and an auxiliary storage device 2804 are used as storage devices. For example, a hard disk drive or a solid state drive (SSD) may be used as the auxiliary storage device 2804. The computer includes the CPU 2801 that executes a program implementing the editing log management module 110, the degree-of-importance calculation module 130, the display content control module 150, the timeline display content control module 1250, the user-participation/terminal-connection-state management module 1660, and the reason-for-document-editing management module 1670, for example; the RAM 2802 that stores the program and data; the ROM 2803 that stores a program for booting the computer; the auxiliary storage device 2804 (which may be a flash memory or the like) having the functions of the editing log accumulation module 120 and the degree-of-importance accumulation module 140, for example; an accepting device 2806 that accepts data based on a user operation, such as a keyboard, a mouse, a touchscreen, or a microphone; an output device 2805 such as a cathode ray tube (CRT) display, a liquid crystal display, or a speaker; a communication network interface 2807 connected to a communication network, such as a network interface card; and a bus 2808 that connects the above components to one another and allows the above components to communicate data with one another. Plural computers described above may be connected to one another via a network.

Note that the various exemplary embodiments described above may be combined together (including addition of a module according to a certain exemplary embodiment to another exemplary embodiment or replacement of a corresponding module of another exemplary embodiment, for example). Further, the technique described in the related art section may be employed in the process performed by each module.

Exemplary embodiments based on a computer program among the exemplary embodiments described above are implemented as a result of loading the computer program, which is software, into a system having the above-described hardware configuration and of software and hardware resources operating in cooperation with each other.

The hardware configuration illustrated in FIG. 28 merely illustrates a configuration example, and the hardware configuration used in the exemplary embodiments is not limited to the configuration illustrated in FIG. 28. The hardware configuration may be any configuration that enables execution of the modules described in the exemplary embodiments. For example, some of the modules may be implemented by dedicated hardware (e.g., an application specific integrated circuit (ASIC)), or may reside on an external system and may be connected to the information processing apparatus 100 via the communication network. Further, plural systems illustrated in FIG. 28 may be connected to one another via the communication network and operate in cooperation with one another. The configuration may be incorporated into a mobile information communication device (such as a mobile phone, a smartphone, a mobile device, or a wearable computer), a smart home appliance, a robot, a copier, a fax, a scanner, a printer, or a multifunction peripheral (an image processing apparatus having two or more functions among functions of a scanner, a printer, a copier, and a fax) as well as the PC.

The described program may be provided after being stored on a recording medium or may be provided via a communication medium. In such a case, for example, the described program may be regarded as the invention related to a "computer readable recording medium storing a program".

The "computer readable recording medium storing a program" is a computer readable recording medium storing a program that is used for installing and executing the program, for distribution of the program, and so on.

Examples of the recording medium include Digital Versatile Discs (DVDs), such as "DVD-R, DVD-RW, and DVD-RAM" based on standards decided by DVD Forum and "DVD+R and DVD+RW" based on standards decided by DVD+RW; Compact Discs (CDs), such as CD-ROM, CD-recordable (CD-R), and CD-rewritable (CD-RW); Blu-ray Discs (registered trademark); magneto-optical disks (MOs); flexible disks (FDs); magnetic tapes; hard disks; ROMs; electrically erasable programmable ROMs (EE-PROMs (registered trademark)); flash memories; RAMs; and secure digital (SD) memory cards.

The program or part of the program may be recorded on the recording media for storage or distribution. Also, the program or part of the program may be transmitted by communication using a transmission medium, for example, a wired network, a wireless communication network, or a combination thereof that is used in a local area network (LAN), a metropolitan area network (MAN), a wide area network (WAN), the Internet, an intranet, or an extranet; or may be propagated over carrier waves.

Moreover, the program may be part of another program or may be recorded on a recording medium together with other individual programs. Alternatively, the program may be divided and portions of the program may be recorded on plural recording media. The program may be recorded in any restorable form, such as a compressed or encrypted form.

The exemplary embodiments described above (particularly, the first to third exemplary embodiments) may be construed as follows. Accordingly, these configurations may be combined with the configurations of the exemplary embodiments described above (particularly, the fourth to sixth exemplary embodiments).

[A] An information processing apparatus including:
    an obtaining unit that obtains log information regarding a document edited by plural users, the log information at least including information for identifying a component edited in the document and information for identifying a user who has edited the component; and
    a notifying unit that notifies, in a case where a first user among the plural users edits a component of the document and then a second user among the plural users edits the component of the document, the first user that the component of the document has been edited, in a display manner based on a degree of importance for the first user.

[B] The information processing apparatus according to [A], wherein
    the log information further includes information regarding an organization or role of each of the first user and the second user, and
    the degree of importance is based on a degree of connection between the organization or role of the first user and the organization or role of the second user.

[C] The information processing apparatus according to [A] or [B], wherein
    the log information further includes information indicating an amount of edited content, and
    the degree of importance is based on a scale of the editing indicated by the amount of edited content.

[D] The information processing apparatus according to any one of [A] to [C], wherein the degree of importance is based on a frequency of the editing.

[E] The information processing apparatus according to any one of [A] to [D], wherein
    the log information further includes type information regarding a type of the edited component, the type information indicating whether the edited component is a body of the document or a comment added to the document, and
    the degree of importance is based on the type of the edited component.

[F] The information processing apparatus according to any one of [A] to [E], wherein
    the log information further includes location information regarding a location of the user, and the degree of importance is based on a distance between the location of the first user and the location of the second user.

[G] The information processing apparatus according to any one of [A] to [F], wherein the notifying unit makes the notification by using an annotation that is addable to the document.

[H] The information processing apparatus according to any one of [A] to [G], further including:
a display that displays the edited component indicated by the notification upon an area showing the notification made by the notifying unit being selected by a user operation.

[I] The information processing apparatus according to any one of [A] to [H], wherein in the case where the first user has signed off, the notifying unit makes the notification by using timeline display based on the degree of importance upon the first user signing in next time.

[J] The information processing apparatus according to any one of [A] to [I], wherein the degree of importance is dynamically updated when the notification is made by using the annotation or by the timeline display.

[K] A non-transitory computer readable medium storing a program causing a computer to execute a process for information processing, the process including:
obtaining log information regarding a document edited by plural users, the log information at least including information for identifying a component edited in the document and information for identifying a user who has edited the component; and
notifying, in a case where a first user among the plural users edits a component of the document and then a second user among the plural users edits the component of the document, the first user that the component of the document has been edited, in a display manner based on a degree of importance for the first user.

Each of the above-described configurations has the following benefits.

The information processing apparatus according to [A] successfully makes a situation in which a user overlooks editing that has been made by another user and that is important for the user less likely than in the case where notifications are uniformly issued for all the contents of editing.

The information processing apparatus according to [B] is capable of issuing a notification by using the degree of importance based on a degree of connection between the organization or role of the first user and the organization or role of the second user.

The information processing apparatus according to [C] is capable of issuing a notification by using the degree of importance based on a scale of the editing.

The information processing apparatus according to [D] is capable of issuing a notification by using the degree of importance based on a frequency of the editing.

The information processing apparatus according to [E] is capable of issuing a notification by using the degree of importance based on the type of the edited component.

The information processing apparatus according to [F] is capable of issuing a notification by using the degree of importance based on a distance between locations.

The information processing apparatus according to [G] is capable of issuing a notification using an annotation.

The information processing apparatus according to [H] is capable of displaying an edited component indicated by the notification.

The information processing apparatus according to [I] is capable of issuing a notification upon sign-in of a user if the user has signed off.

The information processing apparatus according to [J] is capable of dynamically updating the degree of importance.

The non-transitory computer readable medium storing the information processing program according to [K] successfully makes a situation in which a user overlooks editing that has been made by another user and that is important for the user less likely than in the case where notifications are uniformly issued for all the contents of editing.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a first indication output unit that outputs, when a second user edits a document while a first user is not editing the document, an indication for prompting the second user to input a reason for the editing after the second user finishes editing the document,
wherein the first indication output unit outputs the indication for prompting the second user to input the reason for the editing when the editing made by the second user is important for the first user.

2. The information processing apparatus according to claim 1, wherein the case where the editing made by the second user is important for the first user at least includes a case where a portion that has been edited by the first user is edited by the second user.

3. The information processing apparatus according to claim 1, further comprising:
a second indication output unit that outputs, upon the first user starting editing the document, the indication of the reason for the editing made in the document.

4. The information processing apparatus according to claim 3, wherein the second indication output unit outputs an indication of a log corresponding to a period including a time point at which the editing was made by the second user, when the second user is editing the document.

5. The information processing apparatus according to claim 4, wherein the second indication output unit outputs an indication of an edited portion of interest to the second user, when a request is made by the first user in response to the output of the indication of the log.

6. An information processing method comprising:
outputting, when a second user edits a document while a first user is not editing the document, an indication for prompting the second user to input a reason for the editing after the second user finishes editing the document,
wherein the indication for prompting the second user to input the reason for the editing is output when the editing made by the second user is important for the first user.

7. A non-transitory computer readable medium storing a program causing a computer to execute a process for information processing, the process comprising:

outputting, when a second user edits a document while a first user is not editing the document, an indication for prompting the second user to input a reason for the editing after the second user finishes editing the document, wherein the indication for prompting the second user to input the reason for the editing is output when the editing made by the second user is important for the first user.

\* \* \* \* \*